United States Patent
DiMario

(10) Patent No.: US 7,658,967 B2
(45) Date of Patent: Feb. 9, 2010

(54) METHODS FOR APPLYING SOUND DAMPENING AND/OR AESTHETIC COATINGS AND ARTICLES MADE THEREBY

(75) Inventor: Joseph DiMario, Troy, MI (US)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 387 days.

(21) Appl. No.: 11/427,123

(22) Filed: Jun. 28, 2006

(65) Prior Publication Data

US 2007/0048445 A1 Mar. 1, 2007

Related U.S. Application Data

(63) Continuation-in-part of application No. 11/211,188, filed on Aug. 25, 2005.

(51) Int. Cl.
B05D 1/00 (2006.01)
(52) U.S. Cl. .................... 427/162; 427/163.1; 427/164; 427/165; 427/168; 427/169; 427/372.2; 427/384; 427/385.5; 427/389.7
(58) Field of Classification Search ........................ None
See application file for complete search history.

(56) References Cited

U.S. PATENT DOCUMENTS

| | | | |
|---|---|---|---|
| 3,131,158 A | 4/1964 | Kemp et al. | |
| 4,533,254 A | 8/1985 | Cook et al. | 366/176 |
| 4,681,811 A | 7/1987 | Simpson et al. | 428/413 |
| 4,739,019 A | 4/1988 | Schappert et al. | 525/438 |
| 5,071,904 A | 12/1991 | Martin et al. | 524/458 |
| 5,098,947 A | 3/1992 | Metzger et al. | 524/507 |
| 5,368,240 A | 11/1994 | Bonnet | 241/41 |
| 5,588,600 A | 12/1996 | Perfido et al. | 241/23 |
| 6,013,755 A | 1/2000 | Primeaux, II et al. | 528/68 |
| 6,132,882 A * | 10/2000 | Landin et al. | 428/437 |
| 6,403,752 B1 | 6/2002 | House et al. | 528/64 |
| 6,521,706 B1 | 2/2003 | Desai et al. | |
| 6,531,541 B1 | 3/2003 | Desai et al. | 524/832 |
| 6,613,389 B2 | 9/2003 | Li et al. | 427/388.1 |
| 2002/0019480 A1 | 2/2002 | Munro et al. | |
| 2003/0047836 A1 | 3/2003 | Rickner et al. | 264/235 |
| 2003/0105220 A1 | 6/2003 | Gupta et al. | 524/589 |
| 2005/0189442 A1 | 9/2005 | Hussaini et al. | |
| 2006/0046068 A1 | 3/2006 | Barancyk et al. | |

FOREIGN PATENT DOCUMENTS

EP    0 287 192 A2    2/1988

(Continued)

OTHER PUBLICATIONS

Shucai Li, et al, "Studies on Damping Behavior of PS/P(EA-NBA) Lipns", Journal of Applied Polymer Science, vol. 76, No. 5, 2000, pp. 722-727.

(Continued)

Primary Examiner—Emma Cameron
(74) Attorney, Agent, or Firm—Cohen & Grigsby, P.C.

(57) ABSTRACT

A method for providing a coated vehicle transparency, includes the steps of: (a) providing a vehicle transparency having a vision area and a non-vision area; and (b) applying a sound dampening coating composition to at least a portion of the non-vision area of the transparency. The coating composition can an aqueous dispersion of polymeric microparticles prepared from components including: (i) a functional material selected from (a) a nitrile functional material, (b) an amide functional material, and (c) a carbamate functional material; (ii) a polyoxyalkylene acrylate; and (iii) a filler material.

6 Claims, 3 Drawing Sheets

FOREIGN PATENT DOCUMENTS

| | | |
|---|---|---|
| EP | 0 517 466 A2 | 6/1992 |
| EP | 0 869 057 | 10/1998 |
| WO | 99/55783 | 11/1999 |
| WO | 99/55791 | 11/1999 |
| WO | 01/90260 | 11/2001 |
| WO | WO 02/28935 A1 | 4/2002 |
| WO | WO 02/102869 A1 | 12/2002 |
| WO | 2005/093006 | 10/2005 |
| WO | 2005/118162 | 12/2005 |
| WO | 2006/042305 | 4/2006 |
| WO | 2006/052505 | 5/2006 |

OTHER PUBLICATIONS

J. A. Grates, et al, "Noise and Vibration Damping with Latex Interpenetrating Polymer Networks", Journal of Applied Polymer Science, vol. 19, No. 6, 1975, pp. 1731-1743.

*Hawley's Condensed Chemical Dictionary*, 12$^{th}$ Ed. 1993, p. 435.

*Encyclopedia of Chemical Technology*, 1963, vol. 1, p. 305.

ACRONAL DS 3502 Product Bulletin (Nov. 1998).

Oberst ASTM Test Method E756-93("Standard Test Method for Measuring Vibration-Dumping Properties of Materials"), Sections 3 and 10, 1993.

* cited by examiner

METHODS FOR APPLYING SOUND DAMPENING AND/OR AESTHETIC COATINGS AND ARTICLES MADE THEREBY

CROSS-REFERENCE TO RELATED APPLICATIONS

This application is a continuation-in-part of U.S. patent application Ser. No. 11/211,188 filed on Aug. 25, 2005, which is herein incorporated by reference in its entirety. This application is related to U.S. application Ser. No. 11/427,132 entitled "METHODS FOR APPLYING SOUND DAMPENING AND/OR AESTHETIC COATINGS AND ARTICLES MADE THEREBY", which is filed concurrently herewith.

FIELD OF THE INVENTION

The present invention relates to methods of applying coating compositions to substrates to provide a sound and/or vibration dampening effect. The present invention further relates to methods of applying coating compositions to substrates to provide an aesthetically pleasing and/or textured effect.

BACKGROUND OF THE INVENTION

Coating compositions find use in various industries including the coating and/or painting of motor vehicles. Considerable efforts have been expended to develop coating compositions with improved performance (both protective and aesthetic) properties. In the automotive industry, coatings have been applied to various component substrates for both protective and aesthetic purposes. Coatings are used to protect vehicle components against cosmetic damage (e.g., denting, scratching, discoloration, etc.) due to corrosion, abrasion, impacts, chemicals, ultraviolet light, and other environmental exposure. Additionally, color pigmented and high-gloss clear coatings typically further serve as decorative coatings when applied to vehicle body substrates.

To dampen or reduce road and engine noise vibrations, it is known to line floor pans, deck lids, and metal doors of automobiles with precut asphalt- or rubber-based patches to reduce noise from permeating into the passenger compartment of the motor vehicle. Sprayable coatings which are capable of being applied by robotics are desirable to provide labor and cost savings, reduced part inventories and flexibility in design specifications for damping properties.

Generally, any coating that contains a volatile component such as water must undergo a decrease in volume as the volatile component evaporates from the surface of the coating. As the volatile component leaves the coating, contraction forces act to pull the coating inward in all directions. However, without intending to be bound by any theory, it is believed that if the coating has sufficient cohesive strength, the coating will contract in only one dimension, that is, the coating thickness will decrease while the coating resists contraction in any direction parallel to the substrate surface. By contrast, if a coating lacks cohesive strength sufficient to resist contraction parallel to the substrate surface, contraction forces will cause the coating to break up into small flat segments that are separated by continuous linear voids. This surface defect is commonly referred to as "mudcracking".

The automotive industry would derive a significant economic benefit from a coating composition which can be spray applied to form a coating which dries quickly, is essentially free of mudcracking and which provides sound and vibration dampening.

Additionally, hardware-mounted, plastic-molded appliqués are typically used in the automobile industry to identify the make and model of a particular vehicle, such as the manufacturer insignias conventionally placed on the rear portion of an automobile. However, these appliqués are often exposed to harsh environmental conditions and physical trauma, which often results in the scratching or disfigurement of the appliqué and/or detachment of the appliqué from the vehicle.

Thus, the automotive industry would also derive a significant economic benefit from the use of a coating composition and method of application that affix a more damage-resistant appliqué or other insignia to a vehicle which is more resistant to environmental and physical stressors.

Further, the exterior surfaces of automobiles are generally manufactured to have an allover smooth appearance and feel. However, there are certain areas of an automobile in which a texturized appearance and feel is desired, such as the surface of a step rail for a truck.

Thus, the automotive industry would also derive a significant economic benefit from the use of a coating composition and method of application that provide a texturized appearance and feel to designated areas of a vehicle.

SUMMARY OF THE INVENTION

The present invention is directed to the use of a coating to provide a sound and/or vibration dampening effect when applied to a substrate.

The invention is also directed to the use of a coating to provide an aesthetic appearance and texturized surface when applied to a substrate.

The present invention provides a method for providing a coated vehicle transparency, comprising the steps of: (a) providing a vehicle transparency having a vision area and a non-vision area; and (b) applying a sound dampening coating composition to at least a portion of the non-vision area of the transparency. In one nonlimiting embodiment, the coating composition is selected from (a) a polyurea coating composition, (b) an aqueous dispersion of polymeric microparticles, and (c) an epoxy-based coating composition. In another nonlimiting embodiment, the coating composition comprises an aqueous dispersion of polymeric microparticles prepared from components comprising: (i) a functional material selected from (a) a nitrile functional material, (b) an amide functional material, and (c) a carbamate functional material; (ii) a polyoxyalkylene acrylate; and (iii) a filler material; and further comprising at least partially drying the coating composition to provide a coating upon the transparency for inhibiting sound transmission therethrough.

The present invention also provides a method for providing a coated vehicle transparency, comprising the steps of: (a) providing a vehicle transparency having a vision area and a non-vision area; and (b) applying a sound dampening coating composition to at least a portion of the non-vision area of the transparency, and (c) at least partially drying the coating composition to provide a coating upon the transparency for inhibiting sound transmission therethrough, wherein the coating composition comprises: (i) at least one epoxy-functional polymer containing at least two epoxide groups per molecule present in an amount ranging from about 55 to about 99 weight percent of total resin solids of the coating composition; (ii) at least one thermoplastic polymer which is substantially insoluble in the epoxy-functional polymer present in an amount ranging from about 1 to about 45 weight percent of total resin solids of the coating composition; (iii) ground vulcanized rubber particles having an average particle size ranging from about 1 to about 300 microns present in an amount ranging from about 1 to about 70 weight percent of total resin solids of the coating composition; and (iv) a curing agent adapted to cure the epoxy-functional polymer.

The present invention also provides a method for providing a coated vehicle transparency, comprising the steps of: (a) providing a vehicle transparency having a vision area and a non-vision area; and (b) applying a sound dampening coating composition to at least a portion of the non-vision area of the transparency, and (c) at least partially drying the coating composition to provide a coating upon the transparency for inhibiting sound transmission therethrough, wherein the coating composition comprises: (i) at least one epoxy-functional polymer containing at least two epoxide groups per molecule present in an amount ranging from about 40 to about 98.9 weight percent of total resin solids of the coating composition; (ii) at least one thermoplastic polymer which is substantially insoluble in the epoxy-functional polymer present in an amount ranging from about 1 to about 59 weight percent of total resin solids of the coating composition; (iii) at least one vinyl chloride polymer present in an amount ranging from about 0.1 to about 59 weight percent of total resin solids of the coating composition; (iv) ground vulcanized rubber particles having an average particle size ranging from about 1 to about 300 microns present in an amount ranging from about 1 to about 70 weight percent of total resin solids of the coating composition; and (v) a curing agent adapted to cure the epoxy-functional polymer.

The present invention further provides a method for providing a coated vehicle transparency, comprising the steps of: (a) providing a vehicle transparency having a vision area and a non-vision area; and (b) applying a sound dampening coating composition to at least a portion of the non-vision area of the transparency, and (c) at least partially drying the coating composition to provide a coating upon the transparency for inhibiting sound transmission therethrough, wherein the coating composition comprises: (i) at least one monoepoxide polymer present in an amount ranging from about 0.1 to about 5 weight percent of total resin solids of the coating composition; (ii) at least one thermoplastic polymer present in an amount ranging from about 1 to about 59 weight percent of total resin solids of the coating composition; (iii) at least one vinyl chloride polymer present in an amount ranging from about 0.1 to about 59 weight percent of total resin solids of the coating composition; and (iv) ground vulcanized rubber particles having an average particle size ranging from about 1 to about 300 microns present in an amount ranging from about 1 to about 70 weight percent of total resin solids of the coating composition.

The present invention also provides a method for providing a coated transparency comprising the steps of: (a) providing a transparency having a vision area and a non-vision area; (b) applying a coating composition to at least a portion of the non-vision area of the transparency, wherein the coating composition comprises: (i) a first aqueous dispersion of polymeric microparticles having a glass transition temperature greater than 5° C. and being prepared from a first nitrile functional material; (ii) a second aqueous dispersion of polymeric microparticles having a glass transition temperature greater than 5° C. and being prepared from either (a) a second nitrile functional material, the polymeric microparticles of the first aqueous dispersion being different from the polymeric microparticles of the second aqueous dispersion, or (b) a hydroxy functional material; and (iii) a filler material; and (c) at least partially drying the coating composition to provide a coating upon the transparency for inhibiting sound transmission therethrough.

The present invention also provides a method for providing a coated transparency comprising the steps of: (a) providing a transparency having a vision area and a non-vision area; (b) applying a coating composition to at least a portion of the non-vision area of the transparency, wherein the coating composition comprises: (1) an aqueous dispersion of polymeric microparticles having a glass transition temperature greater than 5° C. and being prepared from components comprising: (i) a nitrile functional material; (ii) a hydroxy functional material; and (iii) a filler material; and (c) at least partially drying the coating composition to provide a coating upon the transparency for inhibiting sound transmission therethrough.

The present invention provides a method for providing a coated transparency comprising the steps of: (a) providing a transparency having a vision area and a non-vision area; (b) applying a coating composition to at least a portion of the non-vision area of the transparency, wherein the coating composition comprises: (1) an aqueous dispersion of polymeric acrylic microparticles having a glass transition temperature greater than +10° C. and being prepared from components comprising: (i) a hydroxy functional material; (ii) an acid functional material; (iii) an acrylate monomer; and (iv) a filler material; and (c) at least partially drying the coating composition to provide a coating upon the transparency for inhibiting sound transmission therethrough.

The present invention also includes transparencies made by the methods recited herein.

It should be understood that this invention is not limited to the embodiments disclosed in this summary, but it is intended to cover modifications that are within the spirit and scope of the invention, as defined by the claims.

DETAILED DESCRIPTION OF THE INVENTION

Figure 1:
FIG. 1 is a composite article according to an embodiment of the invention including a metal foil carrier film having a coating layer on one side.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In the disclosure of the present invention, by "polymer" is meant a polymer including homopolymers and copolymers, and oligomers. By "composite material" is meant a combination of two or more differing materials.

As used herein, polymer or oligomer molecular weight is determined by gel permeation chromatography (GPC) using appropriate standards, in many cases polystyrene or sulfonated polystyrene. Unless otherwise indicated, molecular weight refers to number average molecular weight (Mn).

As used herein, an object is deemed to have "color" when the object has specific numeric values of L* (value) (i.e. lightness or darkness) and C* (chroma) (i.e. strength) as determined by measurements defined by the Commission Internationale de l'Eclairage (CIE), which is the international standards organization for color, using the CIELCH method, as set forth in, for example, http://www.datacolor.com/color-experts_004.shtml and http://www.xrite.com/documents/literature/en/L10-001_Understand_Color_en.pdf, which are incorporated herein by reference herein in their entirety. L* and C* are numerical values that refer to the lightness and chroma values, respectively, of a particular point in color space as defined by the CIE. L, C, and H (hue angle) may be automatically calculated from measured tristimulus values X, Y, Z based on the following equations: $L=116(Y/Y_n)^{1/3}-16$; $C=(a^2+b^2)^{1/2}$; $H=\arctan(b^*/a^*)$; $a^*=500[(X/X_n)^{1/3}-(Y/Y_n)^{1/3}]$; $b^*=200[(Y/Y_n)^{1/3}-(Z/Z_n)^{1/3}]$, where $X_n$, $Y_n$, and $Z_n$ are the coordinates of a standard white sample that is used to calibrate the instrument prior to use. For purposes of the present invention, an object having "color" exhibits an L* value of greater than 20.0 (lower numbers being darker), and a C* value greater than 1.0 (lower numbers being weaker). These values are calculated using a 0/45 spectrophotometer, and specific illuminant and standard observer (D65/10) as defined by the CIE. The 0/45 spectrophotometer uses a 0 degree illumination and 45 degree observation when measuring a sample. The D65/10 illuminant/degree observer is an industry standard, and refers to a daylight type of lighting (D65), and the degree observer (10) employed. The degree observer refers to a mathematical model for an "average" observer using a 10 degree visual field. Any object having a color measurement falling outside this range (i.e. wherein the L* value is in the range of 20.0 or less and the C* value is in the range of 1.0 or less) is expressly excluded, is deemed to be "black", and does not exhibit "color" for the purposes of this invention.

An object having a color that "substantially corresponds" to the color of another object, as that term is used herein, refers to an object that has a color which approximates the color of the other object as determined by one of skill in the art, the closeness of which is determined by visual appraisal as is conventionally used for most corresponding color appraisals in, for example, the vehicle industry. Visual appraisal allows for the color impression to be evaluated across all angles of light incidence and observation, which is important when viewing some body colors. This method also provides judgment of closeness of match between objects that varied textured surfaces, such as vehicle bedliners to the body color, and may take into consideration effect pigments, if present, which introduces angle-dependent color (goniochromaticity) and/or sparkling effects. An object having a color that "substantially coordinates" with the color or another object, as that term is used herein, refers to an object that has a color that compliments the color of the other object, which is determined by visual appraisal as is conventionally used for most color appraisals in, for example, the vehicle industry.

As used herein, the term "vehicle body" refers to the visible exterior and/or interior components of a coated vehicle that are, generally, not manufactured to withstand relatively heavy abrasion and/or wear resistance from activities such as loading, storage, foot traffic, and the like. These components, when assembled, form the "vehicle body." For example, for a truck body, these components may include on or more of the vehicle exterior components, such as the side panels, doors, hood, roof, trunk, and the like, and the vehicle interior components, such as dashboard, carpeting, seating upholstery, trim, and the like. For a railcar, these components may include, for example, the exterior side walls, doors, and the like. In contrast for purposes of a "vehicle substrate" having a color that substantially corresponds to a "vehicle substrate" the term "vehicle substrate" refers to the underlying material of those vehicle components that are manufactured specifically to withstand relatively heavy abrasive or wear resistance activities. Where the vehicle is a truck, for example, these components may be a truck bed, running boards, bumper, and the like. For a railcar, these components may be, for example, the railcar bed. As used herein, the abrasive or wear resistant vehicle components formed from the vehicle substrate, when combined with an "associated vehicle body" may form substantially the entirety of the vehicle exterior and/or interior. Other "vehicle bodies" contemplated by the present invention include, for example, those vehicle bodies associated with recreational and watercraft vehicles.

As used herein, the term "sidelight" refers to the glass window(s) of a vehicle located adjacent to the first row of seats, i.e. the driver's row. The term "backlight" refers to the glass window(s) of a vehicle located adjacent to the remaining row(s) of seats. The term "windshield" refers to the glass window of a vehicle at the front end of the vehicle. The term "rearlight" refers to the glass window of a vehicle at the back end of the vehicle, i.e. the rear window.

As used herein, unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$")), and others in the following portion of the specification may be read as if prefaced by the word "about" even though the term "about" may not expressly appear with the value, amount or range. Also, as used herein, the term "polymer" is meant to refer to oligomers and both homopolymers and copolymers.

Also for molecular weights, whether $M_n$ or $M_w$, these quantities are determined by gel permeation chromatography using polystyrene as standards as is well known to those skilled in the art and such as is discussed in U.S. Pat. No. 4,739,019 at column 4, lines 2-45, which incorporated herein by reference in its entirety.

Glass transition temperature ($T_g$) (° C.) is determined using a Differential Scanning Calorimeter (DSC), for example a Perkin Elmer Series 7 Differential Scanning Calorimeter, using a temperature range of about −55° C. to about 150° C. and a scanning rate of about 20° C. per minute.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The coatings including the multi-component composite coatings, of the present invention can be applied to virtually any substrate non-limiting examples of the suitable non-metallic substrates include natural and/or synthetic stone, ceramics, glass, brick, cinderblock and composites, thereof; wallboard, drywall, sheetrock, cement board; plastics, composite plastics including SMC, GTX, nylon, melamine and/or acrylic composites, TPO, TPV, polypropylene, PVC, styrofoam and the like; wood, wood laminates and/or wood composites, asphalt, fiberglass, concrete, any release surface capable of providing free-films as well as materials suitable for use as flooring materials. The polyurea coatings also may be applied directly to soil or gravel. In an embodiment of the invention the polyurea coating composition may be applied to glass substrates, for example, automotive glass substrates. In such an embodiment, the polyurea coating can be applied to glass for example, as an applique, or as an attachment medium for components or hardware mounted to the glass, or as a sound dampener.

In one embodiment, the polyurea compositions of the present invention can be used to form particles via injection molding techniques or casting techniques. Examples of such articles formed using such processes include, but are not limited to flooring tiles, roofing shingles, floor mats or pads, polyurea films or sheets, decorative figures, rods, planking material, bench top coverings and the like.

Metallic substrates suitable for use in the present invention include, for example, ferrous metals, zinc, copper, magnesium, and/or aluminum, and alloys thereof, and other metal and alloy substrates typically used in the manufacture of automobile and other vehicle bodies. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Very often the substrates are truck bodies or truck beds.

The multi-component composite coatings of the present invention may also be applied over plastic substrates such as those that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like.

Non-limiting examples of compositions useful for the practice of the invention will first be described and then the application of the compositions in accordance with the invention will be described. Exemplary Compositions A, B and C will now be described.

Composition A

The present invention may, but need not, include a first coating composition and a second coating composition, each of which may be applied in at least one layer over the substrate. Accordingly, although the coating may be generally described herein as a composite coating, the first coating composition is optional and may, but need not, be applied over the substrate or over a previously applied coating, as an underlayer to the second coating composition.

The first coating composition used in the formation of the multi-component composite coating may be selected from electrodepositable film-forming compositions, primer compositions, pigmented or non-pigmented monocoat compositions, pigmented base coat compositions, transparent topcoat compositions, industrial coating compositions, and other coatings commonly used in the original equipment manufacture of automobiles or in automotive refinish. The first coating composition often comprises a multi-layer coating formed from combinations of at least two of the above-mentioned coating compositions. Non-limiting examples include an electrophoretically-applied composition followed by a spray-applied primer composition, or an electrophoretically-applied composition followed by a spray-applied primer composition and then a monocoat composition, or an electrophoretically-applied composition followed by a spray-applied primer composition and then a color-plus-clear composite coating. Alternatively, the first coating composition may be a single composition applied directly to a metal substrate that optionally has been pretreated, or to a substrate that has been coated previously with one or more protective and/or decorative coatings. The second coating composition may be applied directly over any of the compositions indicated above as the first coating composition.

The first coating composition typically comprises a crosslinking agent that may be selected, for example, from aminoplasts, polyisocyanates, including blocked isocyanates, polyepoxides, beta-hydroxyalkylamides, polyacids, anhydrides, organometallic acid-functional materials, polyamines, polyamides and mixtures of any of the foregoing.

Useful aminoplasts can be obtained from the condensation reaction of formaldehyde with an amine or amide. Nonlimiting examples of amines or amides include melamine, urea and benzoguanamine.

Although condensation products obtained from the reaction of alcohols and formaldehyde with melamine, urea or benzoguanamine are most common, condensates with other amines or amides can be used. For example, aldehyde condensates of glycoluril, which yield a high melting crystalline product useful in powder coatings, can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Nonlimiting examples of suitable aminoplast resins are commercially available from Cytec Industries, Inc. under the trademark CYMEL® and from Solutia, Inc. under the trademark RESIMENE®. Particularly useful aminoplasts include CYMEL® 385 (suitable for water-based compositions), CYMEL® 1158 imino-functional melamine formaldehyde condensates, and CYMEL® 303.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols also can be used. Mixtures of polyisocyanate crosslinking agents can be used.

The polyisocyanate which is utilized as a crosslinking agent can be prepared from a variety of isocyanate-functional materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

If the polyisocyanate is to be blocked or capped, any suitable aliphatic, cycloaliphatic, or aromatic alkyl monoalcohol known to those skilled in the art can be used as a capping agent for the polyisocyanate. Examples of suitable blocking agents include those materials which would unblock at elevated temperatures such as lower aliphatic alcohols including methanol, oximes such as methyl ethyl ketoxime, lactams such as caprolactam and pyrazoles such as dimethylpyrazole.

Polyepoxides are suitable curing agents for polymers having carboxylic acid groups and/or amine groups. Examples of suitable polyepoxides include low molecular weight polyepoxides such as 3,4-epoxycyclohexylmethyl 3,4-epoxycyclohexanecarboxylate and bis(3,4-epoxy-6-methylcyclohexylmethyl) adipate. Higher molecular weight polyepoxides, including the polyglycidyl ethers of polyhydric phenols and alcohols described below, are also suitable as crosslinking agents.

Beta-hydroxyalkylamides are suitable curing agents for polymers having carboxylic acid groups. The beta-hydroxyalkylamides can be depicted structurally as follows:

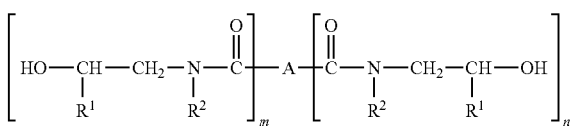

where $R^1$ is H or $C_1$ to $C_5$ alkyl; $R^2$ is H, $C_1$ to $C_5$ alkyl, or

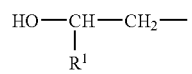

wherein $R^1$ is as described above; A is a bond or a polyvalent organic radical derived from a saturated, unsaturated, or aromatic hydrocarbon including substituted hydrocarbon radicals containing from 2 to 20 carbon atoms; m is equal to 1 or 2; n is equal to 0 or 2, and m+n is at least 2, usually within the range of from 2 up to and including 4. Most often, A is a $C_2$ to $C_{12}$ divalent alkylene radical.

Polyacids, particularly polycarboxylic acids, are suitable as curing agents for polymers having epoxy functional groups. Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811 at column 6, line 45 to column 9, line 54, which is incorporated herein by reference.

Useful organometallic complexed materials which can be used as crosslinking agents include a stabilized ammonium zirconium carbonate solution commercially available from Magnesium Elektron, Inc. under the trademark BACOTE™ 20, stabilized ammonium, zirconium carbonate, and a zinc-based polymer crosslinking agent commercially available from Ultra Additives Incorporated under the trademark ZINPLEX 15.

Nonlimiting examples of suitable polyamine crosslinking agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-propylene diamine, 1,8-octane diamine, isophorone diamine, propane-2,2-cyclohexyl amine, and the like. Nonlimiting examples of suitable aromatic diamines include phenylene diamines and toluene diamines, for example o-phenylene diamine and p-tolylene diamine. Polynuclear aromatic diamines such as 4,4'-biphenyl diamine, methylene dianiline and monochloromethylene dianiline are also suitable.

Suitable polyamide crosslinking agents include those derived from fatty acids or dimerized fatty acids or polymeric fatty acids and aliphatic polyamines. For example, the materials commercially available from Henckel under the trademark designations VERSAMIDE 220 or 125 are quite useful herein.

Appropriate mixtures of crosslinking agents may also be used in the invention. The amount of the crosslinking agent in the first coating composition generally ranges from 5 to 75 percent by weight based on the total weight of resin solids (crosslinking agent plus film-forming resin) in the first coating composition.

The first coating composition may further comprise at least one film-forming resin having functional groups that are reactive with the crosslinking agent. The film-forming resin in the first coating composition may be selected from any of a variety of polymers well-known in the art. In an embodiment of the invention the film-forming resin can be selected from acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art where the polymers are water dispersible, emulsifiable, or of limited water solubility. The functional groups on the film-forming resin in the first coating composition may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, and combinations thereof.

Suitable acrylic polymers include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and preferably 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below. The acrylic polymer can also be prepared with N-(alkoxymethyl)acrylamides and N-(alkoxymethyl)methacrylamides.

Beta-hydroxy ester functional monomers can be prepared from ethylenically unsaturated, epoxy functional monomers and carboxylic acids having from 13 to 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, preferably containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

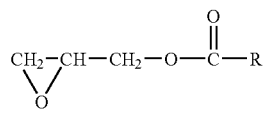

where R is a hydrocarbon radical containing from 4 to 26 carbon atoms. Typically, R is a branched hydrocarbon group having from 8 to 10 carbon atoms, such as neopentanoate, neoheptanoate or neodecanoate. Suitable glycidyl esters of carboxylic acids include VERSATIC ACID 911 and CARDURA E, each of which are commercially available from Shell Chemical Co.

Carbamate functional groups can be included in the acrylic polymer by copolymerizing the acrylic monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Alternatively, carbamate functionality may be introduced into the acrylic polymer by reacting a hydroxyl functional acrylic polymer with a low molecular weight carbamate functional material, such as can be derived from an alcohol or glycol ether, via a transcarbamoylation reaction. In this reaction, a low molecular weight carbamate functional material derived from an alcohol or glycol ether is reacted with the hydroxyl groups of the acrylic polyol, yielding a carbamate functional acrylic polymer and the original alcohol or glycol ether. The low molecular weight carbamate functional material derived from an alcohol or glycol ether may be prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether and methanol are most often used. Other carbamate functional monomers as known to those skilled in the art may also be used.

Amide functionality may be introduced to the acrylic polymer by using suitably functional monomers in the preparation of the polymer, or by converting other functional groups to amido-groups using techniques known to those skilled in the art. Likewise, other functional groups may be incorporated as desired using suitably functional monomers if available or conversion reactions as necessary.

Acrylic polymers can be prepared via aqueous emulsion polymerization techniques and used directly in the preparation of aqueous coating compositions, or can be prepared via organic solution polymerization techniques for solvent borne compositions. When prepared via organic solution polymerization with groups capable of salt formation such as acid or amine groups, upon neutralization of these groups with a base or acid the polymers can be dispersed into aqueous medium. Generally any method of producing such polymers that is known to those skilled in the art utilizing art recognized amounts of monomers can be used.

Besides acrylic polymers, the polymeric film-forming resin in the first coating composition may be an alkyd resin or a polyester. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Where it is desired to produce air-drying alkyd resins, suitable drying oil fatty acids may be used and include, for example, those derived from linseed oil, soya bean oil, tall oil, dehydrated castor oil, or tung oil.

Likewise, polyamides may be prepared utilizing polyacids and polyamines. Suitable polyacids include those listed above and polyamines may be selected from at least one of ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane.

Carbamate functional groups may be incorporated into the polyester or polyamide by first forming a hydroxyalkyl carbamate which can be reacted with the polyacids and polyols/polyamines used in forming the polyester or polyamide. The hydroxyalkyl carbamate is condensed with acid functionality on the polymer, yielding terminal carbamate functionality. Carbamate functional groups may also be incorporated into the polyester by reacting terminal hydroxyl groups on the polyester with a low molecular weight carbamate functional material via a transcarbamoylation process similar to the one described above in connection with the incorporation of carbamate groups into the acrylic polymers, or by reacting isocyanic acid with a hydroxyl functional polyester.

Other functional groups such as amine, amide, thiol, and urea may be incorporated into the polyamide, polyester or alkyd resin as desired using suitably functional reactants if available, or conversion reactions as necessary to yield the desired functional groups. Such techniques are known to those skilled in the art.

Polyurethanes can also be used as the polymeric film-forming resin in the first coating composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are typically used, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Terminal and/or pendent carbamate functional groups can be incorporated into the polyurethane by reacting a polyisocyanate with a polymeric polyol containing the terminal/pendent carbamate groups. Alternatively, carbamate functional groups can be incorporated into the polyurethane by reacting a polyisocyanate with a polyol and a hydroxyalkyl carbamate or isocyanic acid as separate reactants. Carbamate functional groups can also be incorporated into the polyurethane by reacting a hydroxyl functional polyurethane with a low molecular weight carbamate functional material via a transcarbamoylation process similar to the one described above in connection with the incorporation of carbamate groups into the acrylic polymer. Additionally, an isocyanate-functional polyurethane can be reacted with a hydroxyalkyl carbamate to yield a carbamate functional polyurethane.

Other functional groups such as amide, thiol, and urea may be incorporated into the polyurethane as desired using suitably functional reactants if available, or conversion reactions as necessary to yield the desired functional groups. Such techniques are known to those skilled in the art.

Examples of polyether polyols are polyalkylene ether polyols which include those having the following structural formula:

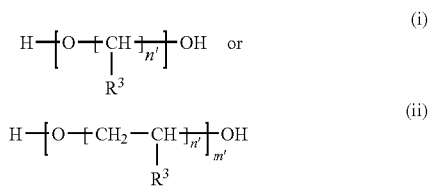

where the substituent $R^3$ is hydrogen or lower alkyl containing from 1 to 5 carbon atoms including mixed substituents, and n' is typically from 2 to 6 and m' is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Pendant carbamate functional groups may be incorporated into the polyethers by a transcarbamoylation reaction. Other functional groups such as acid, amine, epoxide, amide, thiol, and urea may be incorporated into the polyether as desired using suitably functional reactants if available, or conversion reactions as necessary to yield the desired functional groups.

The polyether polymer typically has a number average molecular weight of from 500 to 5000, more often from 1100 to 3200 as determined by gel permeation chromatography using a polystyrene standard, and an equivalent weight of within the range of 140 to 2500, often 500, based on equivalents of reactive pendant or terminal groups. The equivalent weight is a calculated value based on the relative amounts of the various ingredients used in making the polyether polymer and is based on solids of the polyether polymer.

Suitable epoxy functional polymers for use as the film-forming resin in the first coating composition may include a polyepoxide chain extended by reacting together a polyepoxide and a polyhydroxyl group-containing material selected from alcoholic hydroxyl group-containing materials and phenolic hydroxyl group-containing materials to chain extend or build the molecular weight of the polyepoxide.

A chain extended polyepoxide is typically prepared by reacting together the polyepoxide and polyhydroxyl group-containing material neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is usually conducted at a temperature of 80° C. to 160° C. for 30 to 180 minutes until an epoxy group-containing resinous reaction product is obtained.

The equivalent ratio of reactants; i.e., epoxy:polyhydroxyl group-containing material is typically from 1.00:0.75 to 1.00:2.00.

The polyepoxide by definition has at least two 1,2-epoxy groups. In general the epoxide equivalent weight of the polyepoxide will range from 100 to 2000, typically from 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and usually about two; that is, polyepoxides which have on average two epoxide groups per molecule. The most commonly used polyepoxides are polyglycidyl ethers of cyclic polyols, for example, polyglycidyl ethers of polyhydric phenols such as Bisphenol A, resorcinol, hydroquinone, benzenedimethanol, phloroglucinol, and catechol; or polyglycidyl ethers of polyhydric alcohols such as alicyclic polyols, particularly cycloaliphatic polyols such as 1,2-cyclohexane diol, 1,4-cyclohexane diol, 2,2-bis(4-hydroxycyclohexyl)propane, 1,1-bis(4-hydroxycyclohexyl)ethane, 2-methyl-1,1-bis(4-hydroxycyclohexyl)propane, 2,2-bis(4-hydroxy-3-tertiarybutylcyclohexyl)propane, 1,3-bis(hydroxymethyl)cyclohexane and 1,2-bis(hydroxymethyl)cyclohexane. Examples of aliphatic polyols include, inter alia, trimethylpentanediol and neopentyl glycol.

Polyhydroxyl group-containing materials used to chain extend or increase the molecular weight of the polyepoxide may additionally be polymeric polyols such as those disclosed above.

Epoxy functional film-forming resins used in the first coating composition may alternatively be acrylic polymers prepared with epoxy functional monomers such as glycidyl acrylate, glycidyl methacrylate, allyl glycidyl ether, and methallyl glycidyl ether. Polyesters, polyurethanes, or polyamides prepared with glycidyl alcohols or glycidyl amines, or reacted with an epihalohydrin are also suitable epoxy functional resins.

When the first coating composition used in the multi-component composite coating composition of the present invention is electrodepositable, the epoxy functional resin typically also contains ionic groups, typically cationic salt groups.

Appropriate mixtures of film-forming resins may also be used in the multi-component composite coating of the present invention. The amount of the film-forming resin in the first coating composition generally ranges from 25 to 95 percent by weight based on the total weight of resin solids in the first coating composition.

One or more first coating compositions may be used in the multi-component composite coating composition of the present invention, and as mentioned above, may be selected from at least one of electrodepositable film-forming compositions, primers, pigmented monocoats, pigmented base coats, transparent topcoats, industrial coatings and other coatings commonly used in the original equipment manufacture of automobiles or in automotive refinish. If desired, the first coating composition can comprise other optional materials well known in the art of formulated surface coatings, such as plasticizers, anti-oxidants, hindered amine light stabilizers, UV light absorbers and stabilizers, surfactants, flow control agents, thixotropic agents such as bentonite clay, pigments, fillers, organic cosolvents, catalysts, including phosphonic acids and other customary auxiliaries. These materials can constitute up to 40 percent by weight of the total weight of the first coating composition.

The first coating composition can be applied to the substrate by any means, including conventional means such as electrodeposition, brushing, dipping, flow coating, spraying and the like. In the process of electrodeposition, the metal substrate being coated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate.

The usual spray techniques and equipment for air spraying and electrostatic spraying and either manual or automatic methods can be also be used for application of the first coating composition to the substrate.

After application of the optional first coating composition to the substrate, a film is formed on the surface of the substrate by driving water and/or organic solvents out of the film (flashing) by heating or by an air-drying period. If more than one first coating composition is applied to the substrate, flashing may be done after the application of each coating layer.

The coated substrate is then heated to at least partially cure the first coating composition. In the curing operation, solvents are driven off and the film-forming materials are crosslinked. The heating or curing operation is usually carried out at a temperature in the range of from 160-350° F. (71-177° C.) but if needed, lower or higher temperatures may be used as necessary to activate crosslinking mechanisms. Again, if more than one first coating composition is applied to the substrate, curing may be done after the application of each coating layer, or curing of multiple layers simultaneously is possible.

The second coating composition may be applied over at least a portion of the substrate, or over at least a portion of the first coating in embodiments where the present invention is a composite coating. The sprayable polyurea compositions used as the second coating composition in the multi-component composite coating of the present invention typically are two-component compositions, including an isocyanate-functional component and an amine-functional component. In one embodiment of the present invention, the polyurea coating is formed using a process comprising the following steps: (a) selecting an isocyanate-functional component and an amine-functional component such that the ratio of equivalents of isocyanate groups to equivalents of amine groups is greater than 1 while the volume mixing ratio of the isocyanate-functional component to the amine-functional component is capable of being applied to a substrate at 1:1; (b) mixing the isocyanate-functional component and the amine-functional component in a volume ratio to produce a reaction mixture; and (c) applying the reaction mixture to a substrate to form a polyurea coating on the substrate.

A polyurea coating prepared by the process in this embodiment of the present invention results in a coating with acceptable tack-free time and a rapid, predictable cure time. The controlled cure rate of the process of the present invention can result in a two-coat application of a polyurea coating having a textured surface.

Such polyurea compositions may be prepared according to the process using a two-component mixing device. In a particular embodiment, the polyurea compositions may be prepared using a high pressure impingement mixing device in which equal volumes of an isocyanate-functional component and an amine-functional component are impinged upon each other and immediately sprayed onto at least a portion of the substrate or the first coating composition to produce a second coating thereover. The isocyanate-functional component and the amine-functional component react to produce a polyurea composition which is cured upon application to the substrate or the first coating on the substrate. High-pressure impingement mixing is particularly useful in preparing coatings from polymeric systems that have very fast reaction kinetics such as in the preparation of a polyurea. Polyurea coatings are typically formulated with a stream of an isocyanate-functional component herein referred to as an "A-side" and a stream of an amine-functional component herein referred to as a "B-side". The A-side containing the isocyanate-functional component may be at least one polyisocyanate including monomers, prepolymers, oligomers, or a blend of polyisocyanates. A prepolymer is a polyisocyanate which is pre-reacted with a sufficient amount of polyamine(s) or other isocyanate reactive components (such as one or more polyols as are well-known in the art) so that reactive sites on the polyisocyanate still remain in the prepolymer. Those remaining reactive sites on the polyisocyanate prepolymer are then available to react further with components in the B-side.

The present invention is described hereafter in the use of monomeric polyisocyanates, but this is not meant to be limiting. The present invention encompasses those coating compositions comprising a polyisocyanate prepolymer, as described above, or a blend of polyisocyanates; e.g., a blend of one or more polyisocyanate prepolymers and/or one or more monomeric polyisocyanates. Suitable polyisocyanate reactants used on the A-side include isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, OCN—C(CH$_3$)$_2$—C$_6$H$_4$C(CH$_3$)$_2$—NCO; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate. Aliphatic isocyanates are particularly useful in producing polyurea coatings which are resistant to degradation by UV light. However, in other circumstances, less costly aromatic polyisocyanates may be used when durability is not of significant concern. Non-limiting examples of aromatic polyisocyanates include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate.

An excess of polyisocyanate monomer (i.e., residual free monomer from the preparation of prepolymer) can decrease the viscosity of the polyurea composition, allowing for improved flow over the substrate or the first coating composition. Excess polyisocyanate monomer also has been observed in some instances to provide improved adhesion of the polyurea coating to a previously applied coating and/or to the substrate itself. For example, the cured coatings that have previously been applied to automotive surfaces can comprise functional groups (e.g. hydroxyl groups) that are reactive to isocyanates, thereby enhancing adhesion of the sprayed polyurea composition to the first coating. A lower viscosity polyurea composition also keeps the composition in a flowable state for a longer period of time. In a particular embodiment of the present invention, at least 1 percent by weight, or at least 2 percent by weight, or at least 4 percent by weight of the isocyanate-functional composition comprises at least one polyisocyanate monomer (i.e., residual free polyisocyanate monomer).

It is to be understood that the use of various oligomeric polyisocyanates (e.g., dimers, trimers, polymeric, etc.) and modified polyisocyanates (e.g., carbodiimides, uretone-imines, etc.) is also within the scope of the invention. The A-side or the B-side also may include inert components such as fillers, stabilizers and pigments as are well-known in the art of surface coatings.

Amines suitable for use in B-side of the second coating composition of the present invention may be primary, secondary, tertiary amines or mixtures thereof. The amines may be monoamines, or polyamines such as diamines, triamines, higher polyamines and/or mixtures thereof. The amines also may be aromatic or aliphatic (e.g., cycloaliphatic). In one embodiment, the amine component comprises aliphatic amines to provide enhanced durability. The amine typically is provided as a liquid having a relatively low viscosity (e.g., less than about 100 mPa·s at 25° C.). In one embodiment no primary amine is present in the amine component. In a particular embodiment, the amine component is based upon mixtures of primary and secondary amines. For example, if a mixture of primary and secondary amines is employed, the primary amine can be present in an amount of 20 to 80 percent by weight or 20 to 50 percent by weight, with the balance being secondary amines. Although others can be used, primary amines present in the composition generally have a molecular weight greater than 200 (e.g., for reduced volatility), and secondary amines present generally comprise diamines with molecular weights of at least 190 (e.g., 210-230).

In one particular embodiment, the amine-functional component includes at least one secondary amine present in an amount of 20 to 80 percent by weight or 50 to 80 percent by weight. Suitable secondary amines can include acrylate and methacrylate "acrylate and methacrylate modified amines" is meant both mono- and poly-acrylate modified amines as well as acrylate or methacrylate modified mono- or poly-amines. Such acrylate or methacrylate modified amines typically comprises aliphatic amines. Examples of suitable aliphatic polyamines include, without limitation, ethylamine, the isomeric propylamines, butylamines, pentylamines, hexylamines, cyclohexylamine, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

In an embodiment of the present invention, the secondary amine includes an aliphatic amine, such as a cycloaliphatic diamine. Such amines are available commercially from Huntsman Corporation (Houston, Tex.) under the designation of JEFFLINK™ such as JEFFLINK™ 754. In another embodiment, the amine can be provided as an amine-functional resin. Such amine-functional resin can be a relatively low viscosity, amine-functional resin suitable for use in the formulation of high solids polyurea coatings. While any of a number of different amine-functional resins may be suitable, in one embodiment of the invention, the amine-functional resin comprises an ester of an organic acid, for example, an aspartic ester-based amine-functional reactive resin that is compatible with isocyanates; e.g., one that is solvent-free, and/or has a mole ratio of amine-functionality to the ester of no more than 1:1 so there remains no excess primary amine upon reaction. One example of such polyaspartic esters is the derivative of diethyl maleate and 1,5-diamino-2-methylpentane, available commercially from Bayer Corporation of Pittsburgh, Pa. under the trade name DESMOPHEN NH1220. Other suitable compounds containing aspartate groups may be employed as well. Additionally, the secondary polyamines can include polyaspartic esters which can include derivatives of compounds such as maleic acid, fumaric acid esters, aliphatic polyamines and the like.

The amine-functional component also may include high molecular weight primary amines, such as polyoxyalkyleneamines. The polyoxyalkyleneamines contain two or more primary amino groups attached to a backbone, derived, for example, from propylene oxide, ethylene oxide, or a mixture thereof. Examples of such amines include those available under the designation JEFFAMINE™ from Huntsman Corporation. Such amines typically have a molecular weight ranging from 200 to 7500, such as, without limitation, JEFFAMINE D-230, D-400, D-2000, T-403 and T-5000.

The volume ratio of the isocyanate-functional component to the amine-functional component in a mixing device may be any suitable volume mixing ratio capable of being applied to a substrate, such as at 1:1. A 1:1 volume ratio may be selected to ensure proper mixing within a standard impingement mixing device. One example of a commercially available mixing device accepted for use in the automotive industry is a GUSMER™ VR-H-3000 proportioner fitted with a GUSMER™ Model GX-7 spray gun. In that device, pressurized streams of components of the A-side and the B-side are delivered from two separate chambers of a proportioner and are impacted or impinged upon each other at high velocity to effectuate an intimate mixing of the two components to form a polyurea composition, which is coated onto the desired substrate via the spray gun. During mixing, the components are atomized and impinged on each other at high pressure. Superior control of the polyurea reaction is achieved when the forces of the component streams are balanced. The mixing forces experienced by the component streams are determined by the volume of each stream entering the mixing chamber per unit time and the pressure at which the component streams are delivered. A 1:1 volume ratio of the components per unit time serves to equalize those forces. A 1:1 volume ratio of isocyanate to amine can be particularly relevant for the automotive OEM application of sprayable polyurea truck bed-liners.

Other application/mixing devices known in the art can be used to apply the polyurea compositions of the present invention. One suitable application device is commonly known in the industry as a "static mix tube" applicator. In such a static mix tube, the isocyanate component and the amine component are each stored in a separate chamber or container. As pressure is applied, each of the components is brought into a mixing tube in a 1:1 ratio by volume. Mixing of the components is effected by way of the torturous or cork screw pathway within the tube. The exit end of the tube may have atomization capability useful in spray application of the reaction mixture. Alternatively, the fluid reaction mixture can be applied to the substrate as a bead. A suitable static mix tube applicator is available from Cammda Corporation. Another design, available from V. O. Baker, is a dual cartridge syringe applicator with either a pneumatic or manual pump applicator.

The ratio of equivalents of isocyanate groups to amine groups may be selected to control the rate of cure of the polyurea coating composition, thereby affecting adhesion. It has been found that two-component polyurea compositions capable of being produced, or capable of being applied to the substrate, in a 1:1 volume ratio have advantages particularly in curing and adhesion to the first coating composition when the ratio of the equivalents of isocyanate groups to amine groups (also known as the reaction index) is greater than one, such as 1.01 to 1.10:1, or 1.03 to 1.10, or 1.05 to 1.08. "Being capable of being produced in a 1:1 volume ratio" or "capable of being applied to the substrate in a 1:1 volume ratio" means that the volume ratio varies by up to 20% for each component, or up to 10% or up to 5%. The isocyanate-functional component and the amine-functional component can be selected from any of the isocyanates (including polyisocyanates) and amines listed above to provide a reaction index that is greater than one, while being capable of being applied in a 1:1 volume ratio and acceptable performance of the resulting coating.

In some instances, a desired physical property of a polyurea coating composition for a truck bed-liner is surface texture. Surface texture can be created by first spraying the polyurea composition onto the first coating composition to produce a smooth, substantially tack-free first layer. By "substantially tack-free" is meant the condition wherein upon gently touching the surface of the layer with a loose fitting glove, the glove tip does not stick, or otherwise adhere, to the surface as determined by the Tack-Free Method. The Tack-Free Method provides that the coating composition be sprayed in one coat onto a non-adhering plastic sheet to a thickness of 10 to 15 mil (254-381 microns). When spraying is complete, an operator, using a loose fitting, disposable vinyl glove, such as one commercially available under the trade name Ambidex Disposable Vinyl Glove by Marigold Industrial, Norcross Ga., gently touches the surface of the coating. The coating may be touched more than one time by using a different fingertip. When the glove tip no longer sticks to, or must be pulled from, the surface of the layer, the layer is said to be substantially tack-free. A time beginning from the completion of spraying until when the coating is substantially tack-free is said to be the tack-free time. The tack-free time and the cure time for the polyurea composition may be controlled by balancing levels of various composition components, for example, by balancing the ratio of primary amine to secondary amines. A second or subsequent layer of the polyurea composition then can be applied to the first layer as a texturizing layer or "dust coating". This may be accomplished, for example, by increasing the distance between the application/mixing device and the coated substrate to form discrete droplets of the polyurea composition prior to contacting the coated substrate thereby forming controlled non-uniformity in the surface of the second layer. The substantially tack-free first layer of the polyurea coating is at least partially resistant to the second polyurea layer; i.e., at least partially resistant to coalescence of the droplets of polyurea composition sprayed thereon as the second polyurea layer or dust coating, such that the droplets adhere to, but do not coalesce with, the first layer to create surface texture. Typically the second polyurea layer exhibits more surface texture than the first polyurea layer. An overall thickness of the two polyurea layers may range from 20 to 120 mils, such as from 40 to 110 mils, or from 60 to 100 mils (1524-2540 microns) with the first layer being one half to three quarters of the total thickness (762-1905 microns) and the dust coating being one fourth to one half of the total thickness (381-1270 microns). Note further that each layer of the polyurea coating may be deposited from different compositions. In one embodiment, the first layer is deposited from a polyurea composition comprising an aromatic amine component and an aromatic polyisocyanate component, while the second layer is deposited from a polyurea composition comprising an aliphatic amine component and an aliphatic polyisocyanate component. It should be noted that the "first" polyurea coating layer may comprise one, two, three or more layers, and the "second" polyurea coating layer may be one or more subsequent layers applied thereover. For example, in one embodiment of the present invention four polyurea layers may be applied, with the fourth layer being the dust coating, with each layer having a thickness ranging from 15 to 25 mil (381-635 microns).

The polyurea composition may also include one or more additives, for example, a light stabilizer, thickener, pigment, fire retardant, adhesion promoter, catalyst or other performance or property modifiers. Such additives are typically provided in the A-side but may instead be provided in the B-side or in both.

In a particular embodiment of the present invention, the polyurea composition further comprises, usually in the amine-functional component (B-side) a clay and optionally a silica. In this embodiment, a coating layer formed from the two-component polyurea coating composition over a surface of a metal substrate has been found to have better adhesion to the metal substrate than a similar coating composition without a clay or a silica as determined according to the test method outlined in ASTM D 1876, without use of a fixturing device.

The clay may be selected from any of a variety of clays known in the art including montmorillonite clays such as bentonite, kaolin clays, attapulgite clays, sepiolite clay, and mixtures thereof. Additionally, the clay may be surface treated as is known in the art. Any suitable surface treatment may be used; for example, one or more amines according to the following structures:

$R^1\text{—}NR^2R^3$

$R^1\text{—}N^+R^2R^3R^7$

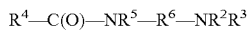

$R^4\text{—}C(O)\text{—}NR^5\text{—}R^6\text{—}NR^2R^3$

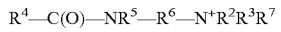

$R^4\text{—}C(O)\text{—}NR^5\text{—}R^6\text{—}N^+R^2R^3R^7$ wherein $R^1$ and $R^4$ are independently $C_4$-$C_{24}$ linear, branched, or cyclic alkyl, aryl, alkenyl, aralkyl or aralkyl, $R^2$, $R^3$, $R^5$ and $R^7$ are independently H or $C_1$-$C_{20}$ linear, branched, or cyclic alkyl, aryl, alkenyl, aralkyl or aralkyl, and $R^6$ is $C_1$-$C_{24}$ linear, branched, or cyclic alkylene, arylene, alkenylene, aralkylene or aralkylene. As a non-limiting example, surface treated bentonite may be used, such as the alkyl ammonium bentonites described in U.S. Pat. No. 3,974,125.

In an embodiment of the invention, the clay is present in the polyurea composition at a level of at least 0.5 percent by weight, in some cases at least 1 percent by weight and in other cases at least 1.5 percent by weight. Also, the clay can be present at up to 6 percent by weight, in some cases up to 5 percent by weight, and in other cases up to 4 percent by weight of the composition. The amount of clay in the two-component polyurea composition can be any value or range between any values recited above, provided the adhesion properties and application viscosity of the polyurea composition are not adversely affected.

As mentioned above, the two-component polyurea composition can optionally include a silica. Any suitable silica can be used, so long as it is a suitable thixotrope that does not compromise application and coating performance properties. In a particular embodiment of the invention, the silica comprises fumed silica.

When present, the silica is present in the two-component coating composition at a level of at least 0.5 percent by weight, in some cases at least 1 percent by weight and in other cases at least 1.5 percent by weight. Also, the silica can be present at up to 6 percent by weight, in some cases up to 5 percent by weight, and in other cases up to 4 percent by weight of the composition. The amount of silica in the two-component coating composition can be any value or range between any values recited above, provided the adhesion properties and application viscosity of the polyurea composition are not adversely affected.

One embodiment of the present invention includes the use of an adhesion promoter for enhancing adhesion of the polyurea composition to the substrate. In an embodiment of the present invention, the substrate may comprise bare metal (including an anodized metal), pretreated metal, or as noted above, there may be a first coating or multi-layer composite coating over which the polyurea composition is applied as part of a multi-component composite coating, selected from electrodepositable film-forming compositions, primer compositions, pigmented or non-pigmented monocoat compositions, pigmented or non-pigmented base coat compositions, transparent topcoat compositions, industrial coating compositions, and other coatings commonly used in the original equipment manufacture of automobiles or in automotive refinish. When the polyurea coating is applied over a first coating, the multi-component composite coating of the present invention typically further comprises an adhesion promoting composition, the adhesion promoting composition being included in at least one of the first and second coating compositions, and/or applied as a separate layer over at least a portion of the first coating layer prior to application of the second coating composition. In this embodiment, the second polymeric layer can have a 90° peel adhesion resistance of at least 5 ft-lbs., or at least 10 ft-lbs., or at least 15 ft-lbs as determined according to the test method outlined in ASTM D 1876, without use of a fixturing device.

The adhesion promoter may be provided with the polyurea components in either the A-side or B-side or both. Alternatively, the adhesion promoter may be applied as a separate layer directly to the substrate or first coating prior to application of the polyurea coating thereto. When applied as a separate layer, the adhesion promoter may be dispersed or dissolved in a carrier such as an organic solvent or water which is evaporated prior to application of the polyurea coating. Alternatively, the adhesion promoter may be in a form which allows for direct application to the substrate. The adhesion promoter may also be a component of the first coating composition. In any case, it may be applied by wiping, dipping, roll coating, curtain coating, spraying or other application techniques as are well known in the art.

Examples of suitable adhesion promoters include amines (such as tertiary amines or melamines), amino silanes, metal complexes and urethane acrylate compositions. The underlying mechanism which enhances adhesion of the polyurea coating to the substrate by the adhesion promoter may involve one or more phenomenon such as but not limited to catalysis of a reaction between reactive groups on the substrate or previously applied coating (e.g. hydroxyl groups) and functional groups of the polyurea composition, reaction with the substrate or bonding with the substrate such as via hydrogen bonding.

Suitable tertiary amines for use as adhesions promoters include 1,5-diazabicyclo[4.3.0]non-5-ene, 1,8-diazabicyclo[5.4.0]undec-7-ene, 1,4-diazabicyclo[2.2.2]octane, 1,5,7-triazabicyclo[4.4.0]dec-5-ene, and 7-methyl-1,5,7-triazabicyclo[4.4.0]dec-5-ene. An example of an amino silane for use as an adhesion promoter is γ-aminopropyltriethoxysilane (commercially available as Silquest A100 from OSY Specialties, Inc.). Other suitable amine-functional adhesion promoters include 1,3,4,6,7,8-hexahydro-2H-pyrimido-(1,2-A)-pyrimidine, hydroxyethyl piperazine, N-aminoethyl piperizine, dimethylamine ethylether, tetramethyliminopropoylamine (commercially available as Polycat® 15 from Air Products and Chemicals, Inc., blocked amines such as an adduct of IPDI and dimethylamine, a melamine such as melamine itself or an imino melamine resin (e.g. Cymel® 220 or Cymel® 303, available from Cytec Industries Inc.). Metal-containing adhesion promoters may include metal chelate complexes such as an aluminum chelate complex (e.g. K-Kat 5218 available from King Industries) or tin-containing compositions such as stannous octoate and organotin compounds such as dibutyltin dilaurate and dibutyltin diacetate. Other adhesion promoters may include salts such as chlorine phosphate, butadiene resins such as an epoxidized, hydroxyl terminated polybutadiene resin (e.g. Poly bd® 605E available from Atofina Chemicals, Inc.), polyester polyols (e.g. CAPA® 3091, a polyester triol available from Solvay America, Inc., and urethane acrylate compositions such as an aromatic urethane acrylate oligomer (e.g. CN999 available from Sartomer Company, Inc.).

In one embodiment of the present invention, the adhesion promoting composition comprises at least one component selected from melamine, a urethane acrylate, a metal chelate complex, a salt, a tin-containing compound and a polyhydric polymer. Suitable melamines include those disclosed above in reference to the crosslinking agents.

In a particular embodiment, the present invention provides a coated substrate, vehicle, or vehicle substrate, comprising a first substrate coated with a first coating composition and a second substrate, typically a truck bed, coated with at least one layer of at least one sprayable polyurea composition, or any of the multi-component composite coatings as disclosed above, deposited over at least a portion of the second substrate. In this embodiment, the first coating composition on the first substrate and at least one layer of the polyurea coating composition comprises one or more pigments, typically color or effect-enhancing pigments, such that at least a portion of the coated vehicle substrate has a color that substantially corresponds to the color of an associated vehicle body. The pigments may be present in either or both of the first polyurea layer and the second, texturizing polyurea layer as part of the polyurea coating. In this embodiment, the color of the second substrate, typically a truck bed coated with at least one polyurea coating composition, is substantially the same as the color of the vehicle body.

Pigments suitable for this purpose can include metallic pigments or organic or inorganic color pigments. Suitable metallic pigments include in particular aluminum flake, copper bronze flake and micaceous pigments such as metal oxide coated mica. Besides the metallic pigments, the coating compositions also or alternatively may contain non-metallic color pigments including inorganic pigments such as titanium dioxide, iron oxide, chromium oxide, lead chromate, and carbon black, and organic pigments such as phthalocyanine blue and phthalocyanine green. In general, the pigment can be incorporated into each coating composition in amounts of about 1 to 80 percent by weight based on the total weight of coating solids. The metallic pigment can be employed in amounts from 0.5 to 25 percent by weight based on the total weight of coating solids.

The present invention additionally relates to a composite article that includes (A) a carrier film having a first and second major surface, and (B) a coating layer superimposed on the first surface of the film, the coating layer formed from a polyurea coating composition that contains at least one isocyanate-functional component and at least one amine-functional component as described above.

Any suitable carrier film can be used in this embodiment so long as the coating layer (B) can be superimposed thereon. Suitable carrier films include, but are not limited to thermoplastic materials, thermosetting materials, metal foils, cellulosic paper, and synthetic papers.

In a further embodiment of the invention, the carrier film comprises a suitable metal foil. As used herein, the term "foil" refers to a thin and flexible sheet of metal. Suitable metal foils that can be used in the carrier film of the invention include, but are not limited to those containing aluminum, iron, copper, manganese, nickel, combinations thereof, and alloys thereof. A particular embodiment of the invention is shown in FIG. 1, where metal foil carrier film 4 is coated by coating layer 2.

In an embodiment of the invention, the carrier film comprises a suitable thermoplastic material. As used herein, the term "thermoplastic material" refers to any material that is capable of softening or fusing when heated and of solidifying (hardening) again when cooled. Suitable thermoplastic materials that can be used as the carrier film of the invention include, but are not limited to, those containing polyolefins, polyurethanes, polyesters, polyamides, polyureas, acrylics, and mixtures thereof.

In another embodiment of the invention, the carrier film comprises a suitable thermosetting material. As used herein, the term "thermosetting material" refers to any material that becomes permanently rigid after being heated and/or cured.

Suitable thermosetting materials that can be used as the carrier film of the invention include, but are not limited to those containing polyurethane polymers, polyester polymers, polyamide polymers, polyurea polymers, polycarbonate polymers, acrylic polymers, resins, copolymers thereof, and mixtures thereof.

In an additional embodiment of the invention, the carrier film comprises synthetic paper. As used herein, the term "synthetic paper" refers to synthetic plain or calendered sheets that can be coated or uncoated and are made from films containing polypropylene, polyethylene polystyrene, cellulose esters, polyethylene terephthalate, polyethylene naphthalate, poly 1,4-cyclohexanedimethylene terephthalate, polyvinyl acetate, polyimide, polycarbonate, and combinations and mixtures thereof. The coated papers can include a substrate coated on both sides with film forming resins such as polyolefin, polyvinyl chloride, etc. The synthetic paper can contain, in suitable combination, various additives, for instance, white pigments such as titanium oxide, zinc oxide, talc, calcium carbonate, etc., dispersants, for example, fatty amides such as stearamide, etc., metallic salts of fatty acids such as zinc stearate, magnesium stearate, etc., pigments and dyes, such as ultramarine blue, cobalt violet, etc., antioxidant, fluorescent whiteners, and ultraviolet absorbers. A non-limiting example of synthetic papers that can be used in the present invention are those available under the tradename TESLIN®, available from PPG Industries, Inc., Pittsburgh, Pa.

Figure 2:
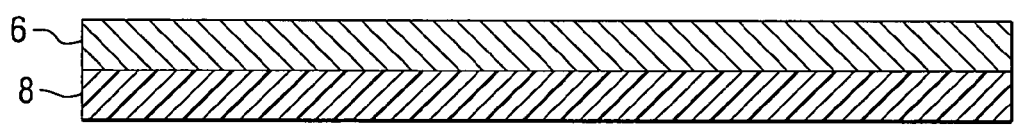
FIG. 2 is a composite article according to an embodiment of the invention including a plastic or synthetic paper carrier film having a coating layer on one side.

A particular embodiment of the invention is shown in FIG. 2, where carrier film 8 is a thermoplastic material, a thermosetting material, or a synthetic paper, which is coated by coating layer 6.

In a particular embodiment of the invention, the carrier film has a film thickness of at least 0.5 μm, in some cases at least 1 μm, in other cases at least 2 μm, in some situations at least 3 μm and in other situations at least 5 μm. Also, the carrier film can be up to 100 μm, in some cases up to 90 μm, in other cases up to 75 μm, in some situations up to 50 μm and in other situations up to 40 μm thick. The carrier film can be any thickness and can vary and range between any thickness recited above, provided the carrier film can adequately support the coating layer (B) and is sufficiently flexible for a given end use application.

As indicated above, the coating layer is formed on the carrier film from at least one coating composition that comprises any of the polyurea compositions described above.

In the present invention, the two-component polyurea coating is formed on a carrier film by: (I) selecting (A) a first component including at least one isocyanate-functional material, and (B) a second component including at least one amine-functional material, where the volume ratio of (A) to (B) is 1:1, and the equivalent ratio of isocyanate groups to amine groups is from 1.03:1 to 1.1:1; (II) mixing (A) and (B) to form a reaction mixture; and (III) applying the reaction mixture to a surface of the carrier film to form a polyurea coating on the carrier film.

In a particular embodiment of the invention, the two-component composition is sprayable and the composite article can be made by spraying the coating compositions onto the film, such as by using a two-component mixing device described above.

In an embodiment of the invention, the carrier film may include an adhesive layer superimposed on the second surface of the film. Any suitable adhesive composition known in the art can be used to form the adhesive layer. Suitable adhesive compositions include those that contain at least one acrylic latex polymer prepared from a monomer composition that includes $C_1$-$C_5$ linear, branches, or cyclic alkyl (meth)acrylate monomers.

In a further embodiment, a temporary protective cover may be superimposed over the adhesive layer. Any suitable material can be used as the protective cover. Suitable materials include, but are not limited to, paper and polymeric materials.

Figure 3:
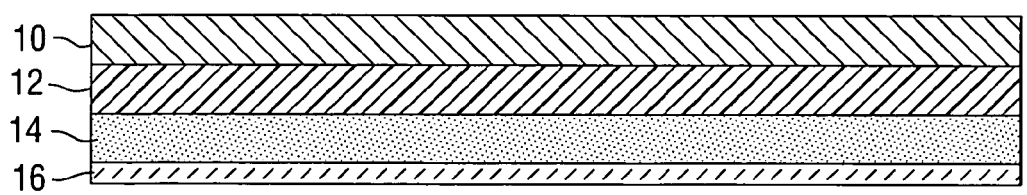
FIG. 3 is a composite article according to an embodiment of the invention including a plastic or synthetic paper carrier film having a coating layer on one side, an adhesive layer on the other side, and a protective layer over the adhesive layer.

A particular embodiment of the invention is shown in FIG. 3, where carrier film 12 is a thermoplastic material, a thermosetting material, or a synthetic paper, which is coated on a first side by coating layer 10. Adhesive layer 14 is coated on a second side of carrier film 12, which is in turn covered by protective layer 16.

The following examples are intended to illustrate the invention, and should not be construed as limiting the invention in any way.

Example 1

A polyurea composition was produced from the formulation of Example 1 in Table 1 by mixing a 1:1 volume ratio of the A-side components to the B-side components in a high-pressure impingement mixing device manufactured by Gusmer Corporation.

The A-side components were premixed and charged into one holding chamber of the mixing device. The B-side was prepared by preparing a prepolymer by mixing the IPDI, terathane, butanediol, and neopentyl glycol under nitrogen. A catalytic amount of dibutyl tin dilaurate (DBTL) was added and the mixture was stirred for 15 minutes. The reaction mixture was first heated to 40° C. and then to 100° C. The resulting prepolymer was cooled to 80° C. and poured into 95% of the Desmodur N3400 and stirred for 15 minutes. Additional Desmodur N3400 was added to adjust the isocyanate equivalent weight.

The ratio of equivalents of isocyanate to amine was calculated as being 1.04.

Another polyurea composition was produced from the formulation of Example 2 in Table 1. The ratio of equivalents of isocyanate to amine was calculated as being 1.08.

TABLE 1

| Component | percent by weight | |
|---|---|---|
| | EX. 1 | EX. 2 |
| A-side | | |
| IPDI (diisocyanate) | 26.8 | 26.8 |
| Desmodur N3400 (diisocyanate) | 50.0 | 50.0 |
| Terathane 650 | 20.8 | 20.8 |
| 1,2-butanediol | 1.2 | 1.2 |
| Neopentyl glycol | 1.2 | 1.2 |
| B-side | | |
| Jeffamine T-3000 (polyoxyalkylene primary amine) | 30.8 | 33.8 |
| Desmophen NH 1220 (amine-functional aspartic acid ester) | 29.5 | 29.8 |
| Jefflink 754 (alicyclic secondary amine) | 34.4 | 31.1 |
| Irganox 1135 (hindered phenolic antioxidant) | 0.02 | 0.02 |
| Tinuvin 328 (benzotriole UV absorber) | 0.02 | 0.02 |
| Molecular sieve Type 3A (Potassium/sodium aluminate | 0.5 | 0.5 |
| Aerosil 200/Cab-O-Sil M-5 (silicon dioxide) | 3.0 | 1.75 |
| Aerosil R972 (silicon dioxide) | 0.5 | — |
| Z-6020 Silane (amino silane) | 0.02 | 0.02 |
| Vulcan XC-72R (carbon black powder) | 1.2 | 1.2 |
| Bentone (bentonite clay) | — | 1.74 |

Composition B

Another exemplary coating composition comprises one or more aqueous dispersions of polymeric microparticles. As used herein, the term "dispersion" means that the microparticles are capable of being distributed throughout water as finely divided particles, such as a latex. See Hawley's Condensed Chemical Dictionary, (12th Ed. 1993) at page 435, which is hereby incorporated by reference. The uniformity of the dispersion can be increased by the addition of wetting, dispersing or emulsifying agents (surfactants), which are discussed below.

Preferably the polymeric microparticles are thermoplastic, although the polymeric microparticles can include functionality which would permit crosslinking with suitable crosslinking agents such as aminoplasts and polyisocyanates. The polymeric microparticles are essentially hydrophobic but have some hydrophilic character to enable dispersion in water.

The polymeric microparticles are prepared from components comprising one or more nitrile materials, such as acrylonitrile, methacrylonitrile, macromonomers, copolymers, esters thereof, nitrile rubbers and mixtures thereof. Useful nitrile materials also include polymers including both vinyl and nitrile groups. Transesterification products of cyanoacetic acid with hydroxyl functional materials are also useful. The nitrile functional material generally comprises about 1 to about 95 weight percent of the components used to prepare the polymeric microparticles on a basis of total weight of the components used to prepare the polymeric microparticles, and preferably about 15 to about 40 weight percent.

In an alternative embodiment, in lieu of or in addition to the nitrile materials discussed above, the polymeric microparticles are prepared from components comprising one or more amide functional materials, such as acrylamides, methacrylamides or n-butoxy methacrylamide and polymers and copolymers thereof present in similar amounts to the nitrile materials discussed above. The amide functional material generally comprises about 1 to about 95 weight percent of the components used to prepare the polymeric microparticles on a basis of total weight of the components used to prepare the polymeric microparticles, and preferably about 15 to about 40 weight percent.

In another alternative embodiment, in lieu of or in addition to the nitrile materials and/or amide functional polymers discussed above, carbamate functional materials can be included in the polymeric microparticles, for example by copolymerizing the nitrile materials and/or amide functional polymers or ethylenically unsaturated monomers with a carbamate functional vinyl monomer, such as a carbamate functional alkyl ester of methacrylic acid, or by reacting a hydroxyl functional acrylic polymer with a low molecular weight carbamate functional material, such as can be derived from an alcohol or glycol ether, via a transcarbamoylation reaction. Other useful carbamate functional monomers are disclosed in U.S. Pat. No. 5,098,947, which is incorporated herein by reference. The carbamate functional material generally comprises about 1 to about 95 weight percent of the components used to prepare the polymeric microparticles on a basis of total weight of the components used to prepare the polymeric microparticles, and preferably about 15 to about 40 weight percent.

In a preferred embodiment, the components used to prepare the polymeric microparticles further comprise one or more polyoxyalkylene acrylates which can reduce mudcracking in the coating composition. Generally, the polyoxyalkylene acrylate comprises a backbone of repeating alkylene glycol units. The polyoxyalkylene acrylate can be terminated at one end with an acrylate group and at the other end with an alkoxy group containing about 1 to about 6 carbon atoms. The polyoxyalkylene acrylate can further comprise one or more pendant functional groups such as hydroxy, amido, carboxy, carbamate, urea, mercapto or urethane. Preferably, the polyoxyalkylene acrylate has one or more terminal alkoxy groups such as methoxy groups, ethoxy groups, butoxy groups, pentoxy groups and hexoxy groups.

Preferably, the polyoxyalkylene acrylate has a structure (including isomers thereof) as shown in Formula (I) below:

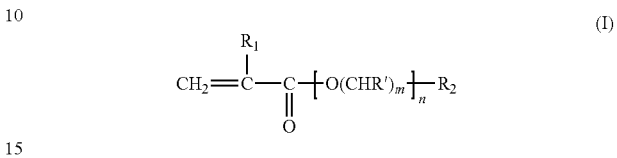

wherein $R_1$ is H or $CH_3$; $R_2$ is a terminal alkoxy group containing about 1 to about 6 carbon atoms, such as methoxy (preferred), ethoxy, butoxy, pentoxy and hexoxy; R' is independently selected from H or $CH_3$; m is an integer which can range from about 2 to about 4; and n is an integer which can range from about 2 to about 200, preferably ranges from about 3 to about 40 and more preferably ranges from about 4 to about 20.

Non-limiting examples of suitable polyoxyalkylene acrylates include alkoxy polyoxyethylene acrylates, alkoxy polyoxyethylene methacrylates, alkoxy polyoxypropylene acrylates, alkoxy polyoxypropylene methacrylates, alkoxy polyoxyethyleneoxypropylene acrylates, alkoxy polyoxyethyleneoxypropylene methacrylates, alkoxy polyoxybutylene acrylates, alkoxy polyoxybutylene methacrylates, copolymers and mixtures thereof. Preferably, the polyoxyalkylene acrylate is methoxy polyoxyethylene methacrylate (also known as methoxy polyethylene glycol methacrylate). A preferred methoxy polyethylene glycol methacrylate is MA-550 which is commercially available from La Porte Chemicals, Houston, Tex.

The polyoxyalkylene acrylate can comprise about 1 to about 99 weight percent of the components used to produce the polymeric microparticles based upon the total weight of components used to produce the polymeric microparticles, preferably about 1 to about 20 weight percent, and more preferably about 3 to about 7 weight percent.

The components used to prepare the polymeric microparticles can further comprise one or more copolymerizable ethylenically unsaturated monomers which are chemically different from the polyoxyalkylene acrylates and nitrile functional materials, i.e., have at least one element or amount of an element which is different from the polyoxyalkylene acrylates and nitrile functional materials, amide functional polymers and carbamate functional materials. The polymeric microparticles can be self-crosslinking, for example by forming the polymeric microparticles from acrylic monomers capable of internally crosslinking such as n-alkoxyacrylamide, or crosslinked by reaction with suitable crosslinking materials included in the film-forming composition. The polymeric microparticles can be cationic, anionic or nonionic, but are preferably anionic.

Non-limiting examples of useful ethylenically unsaturated carboxylic acid monomers include acrylic acid, methacrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof. Preferred ethylenically unsaturated carboxylic acid monomers are acrylic acid and methacrylic acid.

Non-limiting examples of other useful ethylenically unsaturated vinyl monomers include alkyl esters of acrylic and methacrylic acids, such as methyl acrylate, ethyl acrylate, methyl methacrylate, ethyl methacrylate, butyl acrylate, butyl methacrylate, 2-ethylhexyl acrylate, 2-ethylhexyl methacrylate, 2-hydroxyethyl acrylate, 2-hydroxyethyl methacrylate, hydroxypropyl methacrylate, ethylene glycol dimethacrylate, isobornyl methacrylate and lauryl methacrylate; vinyl aromatics such as styrene and vinyl toluene; acrylamides such as N-butoxymethyl acrylamide; acrylonitriles; dialkyl esters of maleic and fumaric acids; vinyl and vinylidene halides; vinyl acetate; vinyl ethers; allyl ethers; allyl alcohols; derivatives thereof and mixtures thereof.

Generally, the ethylenically unsaturated monomer(s) comprise about 1 to about 85 percent by weight of the components used to produce the polymeric microparticles based upon the total weight of components used to produce the polymeric microparticles, preferably about 40 to about 80 weight percent, and more preferably about 50 to about 70 weight percent.

The polymeric microparticles can include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, preferably having 2 to 6 carbon atoms in the hydroxy alkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates. Including hydroxyl functional materials in the polymer microparticle components can provide fast drying under ambient conditions (about 25° C. and atmospheric pressure).

Urethane functional groups can be included in the polymeric microparticles by copolymerizing the monomers with a urethane functional monomer such as the reaction product of an ethylenically unsaturated isocyanate with an alkanol.

Urea functional groups can be included in the polymeric microparticles by copolymerizing the monomers with a urea functional monomer such as hydroxyethyl ethylene urea (meth)acrylate.

Ureido functional groups can be included in the polymeric microparticles by copolymerizing the monomers with a ureido functional monomer such as ethylimidazolidone (meth)acrylates and ethylimidazolidone (meth)acryamides. Useful ureido functional materials include the NORSOCRYL ureido functional monomers (which also can contain other acrylate monomers) which are commercially available from Elf Atochem.

In a preferred embodiment, the polymeric microparticles have a glass transition temperature greater than 5° C. and are prepared from one or more nitrile functional materials and one or more hydroxy functional materials, such as acrylonitrile and hydroxyethyl methacrylate. The weight ratio of nitrile functional material to hydroxy functional material can range from about 5:95 to about 95:5, and preferably about 10:3 to about 10:4.

In an alternative preferred embodiment, acrylic polymeric microparticles having a glass transition temperature greater than +10° C. (preferably greater than about +20° C.) are prepared from one or more hydroxy functional materials such as hydroxyethyl methacrylate; one or more acid functional materials such as (meth)acrylic acid; and one or more acrylate monomers such as butyl acrylate and methyl methacrylate. These acrylic polymeric microparticles preferably are generally uniform, i.e., not core-shell. In this embodiment, the amount of hydroxy functional materials used to prepare the microparticles can range from about 1 to about 25 weight percent; the amount of acid functional materials can range from about 0.1 to about 10 weight percent; and the amount of acrylate monomers can range from about 65 to about 98.9 weight percent on a basis of total weight of the monomer components used to prepare the polymeric acrylic microparticles.

Other components which are useful in forming the polymeric microparticles include polyesters, surfactants, initiators, chain transfer agents and solvents. Suitable polyesters include hydroxy functional ethylenically unsaturated polyesters. Useful surfactants include sodium lauryl sulfate. Examples of useful chain transfer agents include tertiary alkyl mercaptans, mercaptoethanol, ethanol and isopropanol. Suitable solvents include butyl ether of dipropylene glycol, methyl ether of propylene glycol and xylene.

The components of the polymeric microparticles can be present as a blend, but preferably are the polymerization reaction product of the components. Methods for polymerizing acrylic monomers with themselves and/or other addition polymerizable monomers and preformed polymers are well-known to those skilled in the art of polymers and further discussion thereof is not believed to be necessary in view of the present disclosure. For example, polymerization of the acrylic monomer can be carried out in aqueous or organic solvent solution such as xylene, in emulsion, or in aqueous dispersion. See Kirk-Othmer, Encyclopedia of Chemical Technology, (1963) Vol. 1 at page 305. Preferably, the acrylic polymer is prepared by emulsion polymerization. The polymerization can be effected by means of a suitable initiator system.

The number average molecular weight ($M_n$) of the polymeric microparticles can range from about 1000 to about 50,000 grams per mole and is preferably about 5000 to about 20,000, as determined by gel permeation chromatography using a polystyrene standard. The glass transition temperature of the polymeric microparticles can range from about −50° C. to about 120° C., preferably about 5° C. to about +50° C., and more preferably about 5° C. to about +35° C.

The acid functional groups can be neutralized using amines such as dimethylethanolamine, ammonia, triethanolamine, dimethylethyl ethanolamine or N',N'-dimethyl aminopropylamine or alkali metal salts such as sodium or potassium hydroxide. Generally, the polymeric microparticles are present in an amount ranging from about 50 to about 100 weight percent on a basis of total resin solids of the coating composition, preferably about 70 to about 95 weight percent, and more preferably about 80 to about 90 weight percent.

In a preferred embodiment, the coating composition comprises a first aqueous dispersion of polymeric microparticles having a glass transition temperature greater than 5° C. (preferably greater than about 10° C.) and being prepared from a first nitrile functional material and a second aqueous dispersion of polymeric microparticles having a glass transition temperature greater than 5° C. (preferably greater than about 10° C.) and being prepared from a second nitrile functional material, the polymeric microparticles of the first aqueous dispersion being different from the polymeric microparticles of the second aqueous dispersion. For example, chemically different nitrile functional materials can be used for the first polymeric microparticles than the second polymeric microparticles and/or other different components can be used for the first polymeric microparticles than the second polymeric microparticles. The weight ratio of the amount of the first aqueous dispersion to the amount of the second aqueous dispersion can range from about 5:95 to about 95:5.

In a preferred embodiment, the polymeric microparticles of the first aqueous dispersion are prepared from at least an acrylonitrile material and polyoxyalkylene acrylate and the polymeric microparticles of the second aqueous dispersion are prepared from at least an acrylonitrile material and a hydroxy functional material. The weight ratio of the amount of the first aqueous dispersion to the amount of the second aqueous dispersion can range from about 5:95 to about 95:5, and preferably about 4:1 to about 5:1. Preferably, the polymeric microparticles are a blend of two different types of polymeric microparticles, one type being prepared by polymerizing acrylonitrile, butyl acrylate, methoxy polyoxyethylene methacrylate, methyl methacrylate and methacrylic acid, the second type being prepared by polymerizing acrylonitrile, butyl acrylate, hydroxyethyl methacrylate, methyl methacrylate and methacrylic acid.

Yet another embodiment of the present invention is a coating composition comprising a blend of a first aqueous dispersion of polymeric microparticles having a glass transition temperature greater than 5° C. and being prepared from a nitrile functional material; and a second aqueous dispersion of polymeric microparticles having a glass transition temperature greater than 5° C. and being prepared from a hydroxy functional material. The weight ratio of the amount of the first aqueous dispersion to the amount of the second aqueous dispersion can range from about 5:95 to about 95:5, and preferably about 4:1 to about 5:1.

In a preferred embodiment, the dispersion of polymeric microparticles in an aqueous medium is prepared by conventional emulsion polymerization techniques which are well known to those skilled in the art. The aqueous microparticle dispersions can be prepared by conventional emulsion batch process or a continuous process. In one example of a batch process, the unreacted microdispersion is fed over a period of about 1 to 4 hours into a heated reactor initially charged with water. The initiator can be fed in simultaneously, it can be part of the microdispersion or it can be charged to the reactor before feeding in the microdispersion. The optimum temperature depends upon the specific initiator being used. The length of time typically ranges from about 2 hours to about 6 hours. The temperature of reaction can range from about 25° C. to about 90° C.

In a preferred embodiment, water and a small portion of the alkyl acrylate monomers are charged to a reactor with a small amount of surfactant and free radical initiator to form a seed. A preemulsion of the remaining monomers, surfactant and water are fed along with the initiator over a prescribed period of time (3 hours) at a reaction temperature of 80-85° C. using a nitrogen blanket. After a one hour hold, upon completion of the monomer feed, a post redox feed to reduce residual free monomer (including hydrogen peroxide/isoascorbic acid) is added to the reactor. The latex product is neutralized to a pH of about 8.

In order to conduct the polymerization of the ethylenically unsaturated monomers, a free radical initiator is usually present. Both water soluble and oil soluble initiators can be used. Since the addition of certain initiators, such as redox initiators, can result in a strong exothermic reaction, it is generally desirable to add the initiator to the other ingredients immediately before the reaction is to be conducted. Examples of water soluble initiators include ammonium peroxydisulfate, potassium peroxydisulfate and hydrogen peroxide. Examples of oil soluble initiators include t-butyl hydroperoxide, dilauryl peroxide, t-butyl perbenzoate and 2,2'-azobis (isobutyronitrile). Preferably redox initiators such as ammonium peroxydisulfate/sodium metabisulfite or t-butylhydroperoxide/isoascorbic acid are utilized herein.

Alternatively, the dispersion of polymeric microparticles in an aqueous medium can be prepared by a high stress technique such as microfluidization by use of a MICROFLUIDIZER® emulsifier which is available from Microfluidics Corporation in Newton, Mass. The MICROFLUIDIZER® high pressure impingement emulsifier is disclosed in U.S. Pat. No. 4,533,254, which is hereby incorporated by reference. The device consists of a high pressure (up to about $1.4\times10^5$ kPa (20,000 psi)) pump and an interaction chamber in which emulsification takes place. The pump forces the mixture of reactants in aqueous medium into the chamber where it is split into at least two streams which pass at very high velocity through at least two slits and collide, resulting in the particulation of the mixture into small particles. Generally, the reaction mixture is passed through the emulsifier once at a pressure of between about $3.5\times10^4$ and about $1\times10^5$ kPa (5,000 and 15,000 psi). Multiple passes can result in smaller average particle size and a narrower range for the particle size distribution. When using the aforesaid MICROFLUIDIZER® emulsifier, stress is applied by liquid-liquid impingement as has been described. However, it should be understood that, if desired, other modes of applying stress to the pre-emulsification mixture can be utilized so long as sufficient stress is applied to achieve the requisite particle size distribution, that is, such that after polymerization less than 20 percent of the polymer microparticles have a mean diameter greater than 5 microns. For example, one alternative manner of applying stress would be the use of ultrasonic energy.

Once the polymerization is complete, the resultant product is a stable dispersion of polymer microparticles in an aqueous medium. The aqueous medium, therefore, is substantially free of water soluble polymer. The resultant polymer microparticles are, of course, insoluble in the aqueous medium. As used herein, "substantially free" means that the aqueous medium contains no more than 30 percent by weight of dissolved polymer, preferably no more than 15 percent. By "stably dispersed" is meant that the polymer microparticles do not settle upon standing and essentially do not coagulate or flocculate during manufacturing or on standing.

Preferably, the particle size of the polymer microparticle dispersion is uniformly small, i.e., after polymerization less than 20 percent of the polymer microparticles have a mean diameter which is greater than 5 microns, more preferably greater than 1 micron. Generally, the microparticles have a mean diameter from about 0.01 microns to about 10 microns. Preferably the mean diameter of the particles after polymerization ranges from about 0.05 microns to about 0.5 microns. The particle size can be measured with a particle size analyzer such as the Coulter N4 instrument commercially available from Coulter. The instrument comes with detailed instructions for making the particle size measurement. However, briefly, a sample of the aqueous dispersion is diluted with water until the sample concentration falls within specified limits required by the instrument. The measurement time is 10 minutes.

Generally, the microparticle dispersions are materials of relatively low viscosity. Dispersions can be prepared directly with a total solids content of from about 20 percent to about 70 percent. The molecular weight of the polymer and viscosity of the claimed aqueous dispersions are independent of each other. The weight average molecular weight can range from a several thousand to greater than 500,000 grams per mole.

The microparticle can be either internally crosslinked or uncrosslinked. When the microparticles are internally crosslinked, they are referred to as a microgel. Monomers used in preparing the microparticle so as to render it internally crosslinked include those ethylenically unsaturated monomers having more than one site of unsaturation, such as ethylene glycol dimethacrylate, allyl methacrylate, hexanediol diacrylate, methacrylic anhydride, tetraethylene glycol diacrylate, tripropylene glycol diacrylate, and the like.

Microparticles can have a core/shell morphology or interpenetrating morphology if suitable hydrophilic ethylenically unsaturated monomer(s) are included in the mixture of monomer(s) used to produce reaction product. Due to its hydrophobic nature, the hydrophobic polymer will tend to be incorporated into the interior, or core, of the microparticle and the hydrophilic monomer(s) will tend to be incorporated into the exterior, or shell, of the microparticles. Suitable hydrophilic monomers include, for example, acrylic acid, methacrylic acid, vinyl acetate, N-methylol acrylamide, hydroxyethyl acrylate, and hydroxypropyl methacrylate. As mentioned in U.S. Pat. No. 5,071,904, it may be desirable to add water soluble monomer(s) after the other components of the dispersion of polymeric microparticles have been particularized into microparticles.

In order to obtain the advantages of a high solids waterborne coating composition, the coating composition should have sufficiently low viscosity to allow adequate atomization of the coating during spray application. The viscosity of the primary coating composition can be controlled partially by choosing components and reaction conditions that control the amount of hydrophilic polymer in the aqueous phase and in the shell of the polymeric microparticles. Interactions among microparticles, and consequently the rheology of coatings containing them, are greatly affected by the ionic charge density on the surface of the microparticles. Charge density can be increased by increasing the amount of acrylic acid polymerized into the shell of a microparticle. The amount of acrylic acid incorporated into the shell of a microparticle can also be increased by increasing the pH of the aqueous medium in which the polymerization takes place.

The coating composition can further comprise one or more polymeric film-forming materials chemically different from the polymeric microparticles discussed above. Useful polymeric film-forming materials include polyepoxides, polyurethanes, polyamides, polyesters, polyacrylates, polyvinyl chlorides and mixtures and copolymers thereof.

Useful polyepoxides have at least two epoxide or oxirane groups per molecule and include epoxy-functional oligomers, polymers and/or copolymers. Generally, the epoxide equivalent weight of the epoxy-functional polymer can range from about 70 to about 4,000, as measured by titration with perchloric acid and quaternary ammonium bromide using methyl violet as an indicator. Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials include polyepoxides comprised of epoxy polyethers obtained by reacting an epihalohydrin (such as epichlorohydrin or epibromohydrin) with a di- or polyhydric alcohol in the presence of an alkali, such as diglycidyl ethers of bisphenol A, for example EPON® 828 epoxy resin which is commercially available from Shell Chemical Company.

Useful thermoplastic polymeric film-forming materials include polyvinyl acetate; aromatic vinyl polymers; vinyl copolymers having vinyl aromatic hydrocarbons as monomer components such as polystyrene, styrene-butadiene copolymers, styrene-divinylbenzene copolymers and styrene-acrylonitrile copolymers; saturated polyesters including saturated aliphatic polyesters such as polyneopentyl adipate, polypropylene adipate and poly epsilon-caprolactone; polyacrylates such as polyalkyl (meth)acrylates having alkyl groups with 1-8 carbon atoms, polymethacrylates or polyalkyl(meth) acrylates obtained by polymerization of methyl methacrylate, isobutyl methacrylate and 2-ethylhexyl acrylate; saturated polyester urethanes; polybutadienes; polyvinyl chlorides and polyvinyl chloride/acetates. Useful substantially saturated polyesters are prepared from polyfunctional acids and polyhydric alcohols by methods such as are disclosed in U.S. Pat. No. 4,739,019 at column 3, line 22 through column 5, line 15.

In a preferred embodiment, a polyacrylate film-forming material such as ACRONAL DS 3502 polyacrylate copolymer emulsion prepared from methyl acrylate, butyl acrylate, methyl methacrylate and methacrylic acid is included in the coating composition. See ACRONAL DS 3502 Product Bulletin (November 1998), which is hereby incorporated by reference.

Generally, the film-forming material is present in the coating composition in an amount ranging from about 1 to about 40 percent by weight based on the total resin solids of the composition, preferably about 5 to about 30 percent by weight.

The coating composition further comprises one or more fillers for improving the vibration and sound dampening capabilities of the coating. Useful fillers include mica, powdered slate, montmorillonite flakes, glass flakes, metal flakes, graphite, talc, iron oxide, clay minerals, cellulose fibers, mineral fibers, carbon fibers, glass or polymeric fibers or beads, ferrite, calcium carbonate, calcium, magnesium carbonate, barytes, ground natural or synthetic rubber, silica, aluminum hydroxide, alumina powder and mixtures thereof.

The filler material can comprise about 20 to about 90 weight percent of the coating composition on a basis of total weight of the coating composition, and preferably about 50 to about 80 weight percent.

Additionally, one or more plasticizers can be included in the dispersion phase with these polymers and copolymers. Non-limiting examples of suitable plasticizers include adipates, benzoates, glutarates, isophthalates, phosphates, polyesters, sebacates, sulfonamides and terephthalates. The amount of plasticizer can range from about 0.1 up to about 50 weight percent of the total weight of the coating composition.

The compositions can include a variety of optional ingredients and/or additives that are somewhat dependent on the particular application of the composition, such as dyes or pigments such as carbon black or graphite, reinforcements, thixotropes, accelerators, surfactants, extenders, stabilizers, corrosion inhibitors, diluents, blowing agents and antioxidants. Suitable thixotropes include fumed silica, bentonite, stearic acid-coated calcium carbonate, fatty acid/oil derivatives and associative urethane thickeners such as RM-8 which is commercially available from Rohm and Haas. Thixotropes are generally present in an amount of up to about 20 weight percent. Optional additional ingredients such as carbon black or graphite, blowing agents, expandable polymeric microspheres or beads, such as polypropylene or polyethylene microspheres, surfactants and corrosion inhibitors like barium sulfonate are generally present in an amount of less than about 5 weight percent of the total weight of the composition.

The viscosities of these coating products are application-specific based on type of equipment used, required film thickness and sag resistance. Preferably, the viscosity of the coating compositions greater than 1000, preferably ranges from about 1000 to about 1,000,000 centipoise ("cp") measured at 2 RPM with a #7 spindle Brookfield measurement. Sprayable compositions preferably have viscosities below about 100,000 cp at 20 RPM reading on the Brookfield viscometer at ambient temperature (about 25° C.). The coating composition can be prepared by mixing the polymeric microparticle dispersion with the other components of the coating composition in a high energy vacuum mixer such as Dual Disperser Model HHL-2-1000 commercially available from Hockmeyer.

The compositions can be applied to the surface of a substrate in a number of ways, including spraying, extrusion, or by hand with a blade. Useful substrates include those formed from metal, polymers, such as thermoset materials and thermoplastic materials, and combinations of metal and polymeric substrates. Suitable metal substrates that can be coated according to the present invention include ferrous metals such as iron, steel, and alloys thereof, non-ferrous metals such as aluminum, zinc, magnesium and alloys thereof, and combinations thereof. Preferably, the substrate is formed from cold rolled steel, electrogalvanized steel such as hot dip electrogalvanized steel or electrogalvanized iron-zinc steel, aluminum or magnesium. The metal substrate to be treated can be bare, pretreated or prepainted (for example by electrocoating) prior to application of the coating.

Useful thermoset materials include polyesters, epoxides, phenolics, polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, EPDM rubber, copolymers and mixtures thereof.

The coatings, when applied to a substrate, can provide fast-drying, mudcrack resistant coatings which can inhibit sound and or vibration transmission through the substrate.

The coatings will now be illustrated by the following specific, non-limiting example.

Example 2

The polymeric materials were prepared in a four neck round bottom flask equipped with a thermometer, mechanical stirrer, condenser, nitrogen sparge and a heating mantle. The ingredients used to prepare each of Samples 1-5 and Comparative Sample 1 are shown in Table 2.

Water and a small portion of the methyl methacrylate and butyl acrylate were charged to the reactor with a small amount of ALIPAL surfactant and ammonium persulfate free radical initiator to form a seed. A preemulsion of the remaining monomers, surfactant and water were fed along with the initiator over a prescribed period of time (3 hours) at a reaction temperature of 80-85° C. using a nitrogen blanket. After a one hour hold, upon completion of the monomer feed, a post redox feed to reduce residual free monomer (including hydrogen peroxide/isoascorbic acid) was added to the reactor. The latex was neutralized to a pH of about 8 with dimethylamino ethanol. The final pH of each of the latices was about 7.5-8.5, the nonvolatile content was 39-40%, the Brookfield viscosity was 100-200 cps (spindle #1, 50 rpm), and the particle size was 1000-2000 angstroms.

TABLE 2

| Component | Sample 1 | Comp. Sample 1 | Sample 2 | Sample 3 | Sample 4 | Sample 5 |
|---|---|---|---|---|---|---|
| | | Weight of Component (grams) | | | | |
| Monomer Components | | | | | | |
| Methyl methacrylate | 26.4 | 162.62 | 66.1 | 212.74 | 26.4 | 13.2 |
| Butyl acrylate | 785 | 392.56 | 1506.7 | 301.35 | 754.6 | 377.3 |
| Acrylonitrile | 298.8 | 0 | 997.6 | 0 | 399 | 199.5 |
| Hydroxyethyl methacrylate | 0 | 0 | 350.3 | 70.05 | 0 | 0 |
| Methoxy polyethylene glycol methacrylate[1] | 70.2 | 35.08 | 0 | 0 | 0 | 0 |
| Ethylhexyl acrylate | 0 | 0 | 30 | 6 | 0 | 0 |
| Methacrylic Acid | 15 | 7.5 | 37.5 | 7.5 | 15 | 7.5 |
| Total Monomer Amount | 1195.4 | 597.76 | 2988.2 | 597.64 | 1195 | 597.5 |
| Other Components | | | | | | |
| ALIPAL CO436[2] | 21.4 | 10.71 | 53.6 | 10.71 | 21.4 | 10.7 |
| Ammonium Persulfate | 4.3 | 2.15 | 10.8 | 2.15 | 4.3 | 2.1 |
| Hydrogen Peroxide 50% in water | 4.8 | 2.39 | 12 | 2.39 | 4.8 | 2.4 |
| Isoascorbic Acid | 2.4 | 1.2 | 6 | 1.2 | 2.4 | 1.2 |
| Volatiles | | | | | | |
| Dimethyl amino ethanol | 13.1 | 6.57 | 32.9 | 6.57 | 13.1 | 6.6 |
| Deionized Water | 1768.2 | 884.1 | 4420.5 | 884.1 | 1768.2 | 884.1 |

[1]MA-550 methoxy polyethylene glycol methacrylate ($M_w$ about 550 grams per mole) commercially available from La Porte Chemicals, Houston, Texas.
[2]ALIPAL CO436 surfactant commercially available from Rhodia as Rhodapex CO-436.

About 200 g of coating was prepared from each polymeric dispersion of Samples 1-5 and Comp. Sample 1 formed above. Each dispersion was mixed at low agitation in a pint-sized container using an air driven motor for about 1 minute. FOAMMASTER 111 hydrocarbon defoamer (commercially available from Cognis) was added to the dispersion and mixed for about 1 minute, followed by slow addition of DOLOCRON 4512 magnesium calcium carbonate (commercially available from Specialty Minerals) and mixed for about 5 minutes. The mixing speed was increased as components were added to maintain a vortex throughout the procedure. RM-8 water soluble polyurethane thickener (commercially available from Rohm and Haas) was added to the mixture and mixed for 7-10 minutes. Each sample was placed in a vacuum chamber equipped with an agitator and a vacuum at least 700 mm Hg was applied with the agitator turning the material. The sample was removed when foaming subsided (about 3-5 minutes).

Draw downs of 3-4 inches long samples using a 2-inch wide 100-mil thick coating template were prepared on test panels coated with ED-6100 electrocoat which is commercially available from PPG Industries, Inc. of Pittsburgh, Pa. Each draw down was air dried at ambient temperature (about 25° C.), one set at 30% relative humidity and the other set at 60% relative humidity.

The degree of dryness was measured in the center area using a Shore "00" hardness gauge according to ASTM D 2240-97. Higher Shore hardness values indicate drier or stiffer coatings.

Mudcracking was evaluated on a separate set panels. The mudcracking determination was a visual determination based upon number, width and length of cracks. The coating on each panel was dried for two hours at ambient temperature (about 25° C.) at the indicated relative humidity and then for 22 additional hours at ambient temperature and relative humidity (about 50%).

The sound damping of each coating was measured using the Oberst ASTM Test Method E756-93 ("Standard Test Method for Measuring Vibration-Damping Properties of Materials"), Sections 3 and 10, which are hereby incorporated by reference. The principle measure of sound deadening in this test is loss factor, represented by the Greek letter, eta [η], the ratio of loss modulus to storage modulus of the material. Oberst values typically range from 0.001 for uncoated steel (thickness 30 mils) (if the steel panel is struck, one would hear a "clang") to 0.01 ("bong") to 0.1 ("bunk") to 0.5 ("thud") for increasingly efficient coatings. The Oberst test measures the sound loss factor of the coating-substrate composite.

Each test sample was applied to an Oberst Bar, which is a metal bar formed from special oil-hardening ground flat stock, AISI/SAE GRD 0-1, 1/32inch (0.8 mm) thick, ½ inch (12.7 mm) wide from McMaster-Carr, part number 89705-K121, and dried for 6 days in ambient air (about 25° C.). The thickness of each cured coating was 0.070.+/−0.01 inches (1.8 mm). The Oberst loss factor values were normalized to 0.070 inches thickness for comparison. Composite loss factors were compared at 200, 400, 600 and 800 Hz.

TABLE 3

| Components | EX - 1 | EX - 2 | EX - 3 | EX - 4 | EX - 5 | EX - 6 |
|---|---|---|---|---|---|---|
| Air Dry Sound Deadener Examples: | | | | | | |
| Sample 1 | 62.7 | — | — | — | — | 42.7 |
| Comparative Sample 1 | — | 62.7 | — | — | — | — |
| Sample 2 | — | — | 62.7 | — | — | 10 |
| Sample 3 | — | — | — | 62.7 | — | — |
| Acronal DS 3502[3] | — | — | — | — | 62.7 | 10 |
| Foammaster 111[4] | 0.1 | 0.1 | 0.1 | 0.1 | 0.1 | 0.1 |
| Dolocron 4512[5] | 140 | 140 | 140 | 140 | 140 | 140 |
| Acrysol RM-8[6] | 0.2 | 0.2 | 0.2 | 0.2 | 0.2 | 0.2 |
| Total | 203 | 203 | 203 | 203 | 203 | 203 |
| Acrylic Composition: | | | | | | |
| MMA | 2.2 | 27.2 | 2.2 | 35.6 | | |
| BA | 65.7 | 65.7 | 50.4 | 50.4 | | |
| ACN [45% in water] | 25.0 | — | 33.4 | — | | |
| HEMA | — | — | 11.7 | 11.7 | | |
| M-PEG | 5.9 | 5.9 | — | — | | |
| EHA | — | — | 1.0 | 1.0 | | |
| MAA | 1.3 | 1.3 | 1.3 | 1.3 | | |
| Total | 100.0 | 100.0 | 100.0 | 100.0 | | |
| Degree of Drying . . . | | | | | | |
| Shore 00* . . . | | | | | | |
| 30% Rel. Humidity, 2 hrs. | 79-84 | 38-44 | 89-95 | 65-71 | 60-64 | 81-87 |
| 60% relative humidity, 2 hrs. | 55-60 | 15-20 | 70-75 | 50-65 | 55-60 | 75-80 |
| Mudcracking, | | | | | | |
| 30% Rel. Humidity | slight | sl-mod | severe | Mod-severe | moderate | slight |
| 60% Relative Humidity | slight | sl-mod | severe | Mod-severe | moderate | slight |
| Oberst Loss Factor, 6 days air dry - normalized for .07" thickness | | | | | | |
| @+25 C. | | | | | | |
| 200 Hz | 0.204 | 0.030 | 0.030 | 0.127 | 0.231 | 0.146 |
| 400 Hz | 0.425 | 0.051 | 0.030 | 0.126 | 0.533 | 0.147 |
| 600 Hz | 0.646 | 0.072 | 0.035 | 0.125 | 0.835 | 0.147 |
| 800 Hz | 0.867 | 0.092 | 0.039 | 0.124 | 1.137 | 0.148 |

TABLE 3-continued

| Components | EX - 1 | EX - 2 | EX - 3 | EX - 4 | EX - 5 | EX - 6 |
|---|---|---|---|---|---|---|
| @55 C. | | | | | | |
| 200 Hz | 0.026 | 0.002 | 0.143 | 0.090 | 0.022 | 0.063 |
| 400 Hz | 0.043 | 0.006 | 0.224 | 0.157 | 0.022 | 0.107 |
| 600 Hz | 0.060 | 0.011 | 0.306 | 0.223 | 0.022 | 0.151 |
| 800 Hz | 0.077 | 0.016 | 0.388 | 0.289 | 0.023 | 0.194 |

[3] ACRONAL DS 3502 aqueous dispersion of an acrylic copolymer 55% solids commercially available from BASF Corp.
[4] FOAMMASTER 111 hydrocarbon defoamer commercially available from Cognis Canada
[5] DOLOCRON 4512, dolomite calcium magnesium carbonate commercially available from Specialty Minerals.
[6] ACRYSOL RM-8 rheology modifier water soluble polyurethane commercially available from Rohm & Haas.

As shown in Table 3, coating compositions prepared according to the present invention can provide acceptable drying times, mudcracking resistance and sound deadening properties.

Composition C

In a preferred embodiment, Coating Composition C can comprise one or more epoxy-functional polymers, each polymer having at least two epoxide or oxirane groups per molecule. As used herein, "epoxy-functional polymers" means epoxy-functional oligomers (preferred), polymers and/or copolymers. These materials often are referred to as di- or polyepoxides. Generally, the epoxide equivalent weight of the epoxy-functional polymer can range from about 70 to about 4,000, and preferably about 140 to about 600, as measured by titration with perchloric acid and quaternary ammonium bromide using methyl violet as an indicator.

Suitable epoxy-functional polymers can be saturated or unsaturated, cyclic or acyclic, aliphatic, alicyclic, aromatic or heterocyclic. The epoxy-functional polymers can have pendant or terminal hydroxyl groups, if desired. They can contain substituents such as halogen, hydroxyl, and ether groups. A useful class of these materials include polyepoxides comprised of epoxy polyethers obtained by reacting an epihalohydrin (such as epichlorohydrin or epibromohydrin) with a di- or polyhydric alcohol in the presence of an alkali. Suitable polyhydric alcohols include polyphenols such as resorcinol; catechol; hydroquinone; bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane and 1,5-hydroxynaphthalene.

Preferred polyepoxides include diglycidyl ethers of bisphenol A, such as EPON® 828 epoxy resin which is commercially available from Shell Chemical Company. EPON® 828 epoxy resin has a number average molecular weight of about 400 and an epoxy equivalent weight of about 185-192. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, epoxy novolac resins, and polyepoxides that are partially defunctionalized by carboxylic acids, alcohol, water, phenols, mercaptans or other active hydrogen-containing compounds to give hydroxyl-containing polymers. These polyepoxides are well known to those skilled in the art and are described in U.S. Pat. No. 4,739,019 at column 2, line 6 through column 3, line 12.

The amount of the epoxy-functional polymer in the curable coating composition can vary depending in part upon the intended application of the composition. In a preferred embodiment, the epoxy-functional polymer is present in an amount ranging from about 55 to about 99 weight percent of the total resin solids of the curable coating composition, preferably about 60 to about 95 weight percent, and more preferably about 65 to about 85 weight percent. In an alternative preferred embodiment in which one or more vinyl chloride polymers are present, the epoxy-functional polymer is present in an amount ranging from about 40 to about 98.9 weight percent of the total resin solids of the curable coating composition. In another alternative embodiment in which one or more vinyl chloride polymers are present, about 0.1 to about 5 weight percent of a monoepoxide can be included in the coating composition. Preferably, one or more di- or polyepoxides are present in combination with the monoepoxide in this alternative embodiment in an amount ranging from about 20 to about 98.8 weight percent on a total resin solids basis.

Preferably, the polyepoxides are present as liquids or dispersions, although combinations of liquid and solid epoxy-functional polymers can be used as long as the desired viscosity of the curable coating composition is obtained from the other components of the composition.

The curable coating composition also comprises one or more essentially thermoplastic polymers to retard shrinkage at the time of curing. As used herein, "essentially thermoplastic" means that the thermoplastic polymer can contain some percentage of unsaturated units so long as the thermoplastic nature of the polymer is maintained, i.e., it does not react with the other components of the curable composition but rather is present as a blended ingredient. In one preferred embodiment the saturated polyester type of thermoplastic polymer contains no more than about 10 percent by weight of unsaturated units, the percentage being based on the total weight of all of the ingredients of the polyester.

Also, the essentially thermoplastic polymer is preferably substantially insoluble in the epoxy-functional polymer. As used herein, "substantially insoluble" means that the mixture of epoxy-functional polymer and effectively thermoplastic polymer forms a heterogeneous phase that can be hazy. Such thermoplastic polymers usually have a glass transition temperature of less than about 80° C. Non-limiting examples of suitable thermoplastic polymers include: polyvinyl acetate; aromatic vinyl polymers; vinyl copolymers having vinyl aromatic hydrocarbons as monomer components such as polystyrene, styrene-butadiene copolymers, styrene-divinylbenzene copolymers and styrene-acrylonitrile copolymers; saturated polyesters including saturated aliphatic polyesters such as polyneopentyl adipate, polypropylene adipate and poly epsilon-caprolactone; polyacrylates such as polyalkyl (meth)acrylates having alkyl groups with 1-8 carbon atoms, polymethacrylates or polyalkyl(meth)acrylates obtained by polymerization of methyl methacrylate, isobutyl methacrylate and 2-ethylhexyl acrylate; saturated polyester urethanes, and the like. Other useful thermoplastic polymers include polybutadienes, polybutadiene/acrylonitriles, polybutadiene/acrylonitrile, polybutadiene styrenes, polystyrene thermoplastic polymers having a $M_w$ of about 700 to about 150,000, polyvinyl chlorides, polyvinyl chloride/acetates, polyvinyl acetates having a $M_w$ of about 20,000 to about 200,000. Also included are saturated polyethers, optionally with a polyurethane chain extension as known to those skilled in the art having a molecular weight of about 700 to about 10,000.

When polyvinyl chloride polymers are present with the epoxy-functional polymer in the curable coating composition, the polyvinyl chloride polymers can function as the thermoplastic polymer. In this case additional amounts of the thermoplastic polymer would not be necessary.

In a preferred embodiment, the essentially thermoplastic polymer is non-reactive with the curable epoxy-functional polymer in the curable composition. Also, the thermoplastic polymer is substantially free of aromatic units. "Substantially free of aromatic units" means that the thermoplastic polymer contains no more than 10 percent by weight of aromatic units, the percentage being based upon the total weight of all of the ingredients of the thermoplastic polymer. As used herein, an aromatic unit is intended to mean a six carbon ring having pendant hydrogen atoms, the ring having pi electron orbitals above and below the plane of the ring structure, as in benzene.

Preferred thermoplastic polymers are substantially saturated polyesters that satisfy the aforedescribed requirements and are prepared from polyfunctional acids and polyhydric alcohols by methods such as are disclosed in U.S. Pat. No. 4,739,019 at column 3, line 22 through column 5, line 15. Examples of suitable saturated acids for preparing the preferred saturated polyesters include adipic acid, azelaic acid, sebacic acid and the anhydrides thereof where they exist. When some proportion of unsaturation is present, it is commonly introduced by the use of unsaturated polyfunctional acids such as maleic acid and fumaric acid. Commonly utilized polyhydric alchololsare ethylene glycol, propylene glycol, diethylene glycol, dipropylene glycol, butylene glycol, glycerol, trimethylolpropane, pentaerythritol and sorbitol. Preferably the polyester is prepared from a diol and a diacid. These polyesters can be modified with oils or fatty acids, i.e., alkyd resins.

The thermoplastic polymer generally has a weight average molecular weight of up to about 200,000, preferably less than about 20,000, more preferably less than about 10,000, and most preferably from about 1,000 to about 8,000 grams per mole. The thermoplastic polymer can be prepared by free radical polymerization methods or condensation polymerization methods well known to those skilled in the art.

Generally, the amount of the essentially thermoplastic polymer is effective to reduce shrinkage of the cured composition. In a preferred embodiment, the essentially thermoplastic polymer is present in the curable coating composition in an amount ranging from about 1 to about 45 percent by weight based on the total resin solids of the composition, preferably about 1 to about 35 percent by weight, and more preferably about 10 to about 30 percent by weight. When vinyl chloride polymers are present in the coating composition, the thermoplastic polymer is generally present in an amount ranging from about 1 to about 59 weight percent based upon total resin solids of the coating composition.

The coating composition also comprises ground vulcanized rubber particles or powder having an average particle size ranging from about 1 to about 300 microns. The ground vulcanized rubber with the desired particle size can be prepared by any method known to those skilled in the art for achieving such small particle sizes. For instance, U.S. Pat. No. 5,588,600 (hereby incorporated by reference) discloses a method for obtaining rubber particles from used vehicle tires wherein three comminuting steps are used. The second and third of these steps are prefaced by the use of liquid cryogenic grinding. Vulcanized rubber particles facilitate the formation of smaller particle sizes when cryogenic grinding is employed and the ground rubber behaves more like a filling extender in the uncured state. Another method for producing such particles is described in U.S. Pat. No. 5,368,240 (hereby incorporated by reference) in which scrap rubber is used to produce the rubber powder. Particularly suitable rubber particles are commercially available from Environmental Processing Systems Inc. ("EPS") of Garden City, N.Y. from their Santee River Rubber Company. Preferred ground vulcanized rubber particles are EPS-200 particles available from EPS.

The particle size of the rubber particles preferably is about 150 microns ('μ') or less for sprayable curable compositions and less than about 300 microns for other types of curable compositions. Most preferably, the particle size range for the ground rubber is about 5 to about 300 microns. For extrudable and sprayable curable compositions, a preferred particle size range is about 74 to about 200 microns. The average particle size can be determined by the amount of ground rubber that passes through the openings of a mesh screen having a specific mesh size. The mesh size can vary, for instance, 50 U.S. mesh gives a mean particle size of 297 microns, 140 U.S. mesh gives a mean particle size of 105 microns and 325 U.S. mesh gives a mean particle size of 44 microns. Also any measuring equipment known to those skilled in the art for determining particle size distribution can be used.

The ground vulcanized rubber can include additives originally present in the vulcanized rubber that are well known in the rubber industry. For instance when the ground rubber is prepared from recycled tires, a mixture of natural and synthetic rubbers can be present along with carbon black, fillers and oil. The presence of extra additives in the ground rubber does not interfere with performance of the present invention. For instance, the components of the EPS-200 ground rubber on a weight percent basis of the reprocessed rubber are 40 to 45 percent natural rubber and styrene butadiene rubber; 27 to 33 percent carbon black; 2 to 3 percent zinc oxide; 1.5 to 2.5 percent sulfur; 1 to 2 percent stearic acid; and 10 to 20 percent process oil.

The amount of ground rubber particles present in the curable coating composition generally ranges from about 1 to about 70 weight percent of the total resin solids of the curable composition, but the preferred amount can depend upon the particular application of the curable composition. Preferably, when the coating composition is used as an adhesive, sound dampening and/or anti-flutter composition, the amount of the ground rubber particles ranges from about 5 to about 40 weight percent of the total resin solids of the curable composition. The ground rubber particles flexibilize the cured composition. The amount of rubber can be balanced with the amount of fillers to achieve the desired viscosity of the curable composition and desired stiffness of the cured composition. Examples of fillers that can be present include finely divided minerals, such as calcium carbonate, magnesium carbonate, silica, talc, mica and/or clay. One or more hollow fillers, such as glass and plastic microspheres, beads and milled or chopped glass fibers and strands also can be used as fillers. The other fillers can be present in an amount of up to around 10 weight percent of the total resin solids of the coating composition.

The curable coating composition comprises one or more contemporaneous and/or latent curing agents adapted to cure the epoxy-functional polymer(s). Useful curing agents include: aliphatic, cycloaliphatic, and aromatic polyfunctional amines such as ethylene diamine, diethylene triamine, triethylene tetraamine, tetraethylene pentamine, 1,4-diaminobutane; 1,3-diaminobutane, hexamethylene diamine, 3-(N-isopropylamino) propylamine, diaminocyclohexane, and polyoxypropylene amines; meta-phenylene diamine; p,p'-methylene dianiline, and 1,4-aminonaphthalene; polyamides such as those derived from fatty acids, dimerized fatty acids or polymeric fatty acids and aliphatic polyamines; imidazoles; dicyandiamide; and boron trifluoride complexes such as boron trifluoride monoethylamine complex, boron trifluoride diethylamine complex; boron trifluoride triethylamine complex; boron trifluoride pyridine complex; boron trifluoride benzyldimethylamine complex; boron trifluoride benzylamine, boron trifluoride etherate and as are disclosed in U.S. Pat. No. 4,739,019 at column 5, lines 24-62.

The curing agent is present in the curable compositions of the present invention in an amount ranging from about 50 to about 150 percent of the stoichiometric amount for reacting with the curable epoxy-functional polymer on an equivalents basis, and preferably about 60 to about 110 percent.

In an alternative preferred embodiment, the curable coating composition can comprise one or more vinyl chloride polymers. Suitable polymers include vinyl chloride homopolymers and/or copolymers of vinyl chloride and other unsaturated compounds such as vinylidene chloride or vinyl propionate or vinyl acetate. The ratio of epoxy-functional polymer to vinyl chloride polymer, when present, can range from about 1:99 to about 99:1 on a weight percent basis of epoxy-functional polymer and vinyl chloride polymer, and preferably about 15:85 to about 85:15.

Additionally, one or more plasticizers can be included in the dispersion phase with these polymers and copolymers. Non-limiting examples of suitable plasticizers include adipates, benzoates, glutarates, isophthalates, phosphates, polyesters, sebacates and terephthalates. The amount of plasticizer can range from about 0.1 up to about 50 weight percent of the total weight of the curable coating composition. The vinyl chloride polymers produce polymeric entanglements when swelled by the plasticizer to form a fused polymeric material.

The curable compositions of the present invention can include a variety of optional ingredients and/or additives that are somewhat dependent on the particular application of the curable composition, such as pigments such as carbon black or graphite, reinforcements, thixotropes, accelerators, surfactants, plasticizers, extenders, stabilizers, corrosion inhibitors, diluents, blowing agents and antioxidants. Suitable thixotropes include fumed silica, bentonite, stearic acid-coated calcium carbonate and fatty acid/oil derivatives. Thixotropes are generally present in an amount of up to about 20 weight percent. Generally, the amount of an inorganic extender can be up to about 50 weight percent based upon the total weight of the curable composition. Optional additional ingredients such as carbon black or graphite, blowing agents, surfactants and corrosion inhibitors like barium sulfonate are generally present in an amount of less than about 5 weight percent of the total weight of the curable composition.

Diluents and plasticizers can be present in an amount of up to about 50 weight percent of the total weight of the curable composition. Examples of suitable diluents include low molecular weight (from about 100 to about 2000) aliphatic or aromatic ester compounds containing one or more ester linkages, and low molecular weight aliphatic or aromatic ethers containing one or more ether linkages and combinations thereof. Reactive diluents are designed to modify strength and/or adhesion of the cured curable composition, such as aliphatic and/or aromatic monoepoxides having a weight average molecular weight of about 300 to about 1500, can be present in the range of up to about 30 weight percent of the total weight of the curable composition.

The particular optional ingredients that are chosen in the composition and their amounts depend upon the application of the curable composition. Structural adhesives need high strength and low shrink properties. Coatings for reinforcement need an optimized strength and adequate low shrinkage properties so that the visible side of the panel does not exhibit cosmetic defects such as dimples.

Anti-flutter compositions require resilience and expansion capability, typically obtained through the use of blowing agents and/or expandable polymeric microspheres or beads, such as polypropylene or polyethylene microspheres.

The viscosities of these coating products are application-specific based on type of equipment used, required film thickness and sag resistance. Preferably, the viscosity of the coating compositions ranges from about 1000 to about 500,000 centipoise ("cp") measured at 2 RPM with a #7 spindle Brookfield measurement. Sprayable compositions preferably have viscosities below about 100,000 cp at 20 RPM reading on the Brookfield viscometer. Extrudable adhesives and anti-flutter compositions typically have viscosities of between about 100,000 and about 500,000 cp, although for anti-flutter compositions, the viscosity can range up to about 2,000,000 cp.

The curable coating compositions of the present invention can be prepared in a number of ways, including as a one-package composition with a latent curing agent or as a two-package composition. Two package curable compositions are typically prepared by combining the ingredients immediately before use. A one-package composition can be prepared in advance of use and stored.

The preparation of the curable composition can be in a manner similar to that of U.S. Pat. No. 4,739,019 at column 6, lines 2-62. All products can be made in a sigma mixer. Other mixing equipment known to those skilled in the art can be used, such as triaxial and Littleford mixers. Sound damping and other protective coatings are typically prepared as sprayable compositions. Anti-flutters and structural adhesives typically are prepared as extrudable compositions.

The compositions can be applied to the surface of a metal or polymeric substrate in a number of ways, including spraying, extrusion, or by hand with a blade. The metal substrate to be treated can be bare, oily, pretreated or prepainted prior to application of the coating. Suitable polymeric substrates include thermoplastic polymeric substrates.

The coating compositions can be cured by allowing them to stand at ambient temperature, or a combination of ambient temperature cure and baking, or by baking alone. The compositions can be cured at ambient temperature typically in a period ranging from about 24 hour to about 36 hours. If ambient temperature and baking are utilized in combination, the composition is typically allowed to stand for a period of from about 5 hours to about 24 hours followed by baking at a temperature of from about 75° C. to about 200° C., preferably from about 100° C. to about 150° C., for a period of time ranging from about 20 minutes to about 1 hour.

Also provided by the present invention is a method for preparing an adhesive bond between two surfaces to form a bonded structure. The method comprises applying to at least one of the surfaces the curable composition detailed above and then at least partially curing the curable composition to form the bonded structure. The curable compositions of the present invention are useful for adhesives and coatings for structural building components of vehicles, such as doors, frames and hoods.

The present invention will now be illustrated by the following specific, non-limiting example.

Example 3

As shown in Table 4, several adhesive coating compositions were prepared and evaluated as is detailed below. The coating compositions of Table 4 were prepared by blending the ingredients (shown in Table 4) together in a one gallon sigma mixer with liquids being slowly added to powders in the mixing chamber until finished compositions were obtained. The coating compositions of Table 5 were prepared by blending the ingredients (shown in Table 5) together in pint cans with impeller blades until finished compositions were obtained. The values in brackets, [ ], indicate percentage of each component based upon total resin solids. Each composition was tested for physical properties as follows.

Lap shear bonds for testing were prepared using two strips of cold rolled steel having dimensions of 25.4 mm by 101.6 mm by 1.57 mm (1 inch by 4 inches by 0.062 inches). For each composition, a film was applied to one of the metal strips. Several glass microbeads, each having a thickness of 30 mils, were embedded in the film. A second strip of metal was placed over the top of the first strip so that only one square inch of area overlapped. Pressure was applied to the squeeze the first and second strips together such that the thickness of the coating therebetween was 30 mils, i.e., the glass microbeads acted as spacers to maintain 30 mils spacing between the metal strips and thereby maintain the desired coating thickness. The composition was cured as indicated in Table 4 or 5.

The lap shear strength of the bond in pounds per square inch (psi) was determined according to ASTM Method D-1002-65 using an INSTRON tester device. Samples were tested for both initial lap shear strength and after 250 hour salt spray exposure. Two readings were taken for each test, averaged and reported in Tables 4 and 5 following.

TABLE 4

| | Weight percent based upon total weight [based upon total weight of resin solids] | | |
|---|---|---|---|
| Component | Comparative Example 1 | Example A | Example B |
| Epoxy resin[1] | 20.8 [33.0] | 32.4 [50.5] | 42 [69.5] |
| Epoxy resin/Dimer Acid[2] | 18.4 [29.2] | 18.7 [29.2] | — |
| Glycidyl ether of alkyl phenol[3] | 4.9 [7.8] | — | — |
| Polyvinyl chloride homopolymer[4] | — | — | — |
| Diethylene glycol adipate[5] | 18.9 [30] | 13 [20.3] | 18.4 [30.5] |
| Dicyandiamide/imidazole[6] | 2.2 | 2.3 | 2.1 |
| 3-(3,4-dichlorophenyl)-1,1-dimethylurea[7] | 0.6 | 0.7 | 0.6 |
| Mica[8] | 31.9 [50.6] | — | 20.5 [33.9] |
| carbon black[9] | 0.3 | 0.3 | — |
| ground vulcanized rubber (200μ)[10] | — | 32.6 [50.9] | 15.4 [25.5] |
| ground vulcanized rubber (140μ)[11] | — | — | — |
| Montmorillonite clay thixotrope[12] | 2 | — | — |
| fumed silica[13] | — | — | 1 |

TABLE 4-continued

| | Weight percent based upon total weight [based upon total weight of resin solids] | | |
|---|---|---|---|
| Component | Comparative Example 1 | Example A | Example B |
| Lap Shear Strength (psi) | | | |
| Initial Value after 325° F./30 min. bake | 674 | 1603 | 1819 |
| after 400° F./60 min. bake | — | — | 1778 |
| Failure mode (% cohesive) | | | |
| Initial Value after 325° F./30 min. bake | 80 | 100 | 100 |
| after 400° F./60 min. bake | — | — | 100 |
| Lap Shear Strength after 250 hrs. salt spray (psi) | | | |
| Initial Value after 325° F./30 min. bake | 523 | 1637 | 1765 |
| after 400° F./60 min. bake | — | — | 1700 |
| Failure mode (% cohesive) | | | |
| Initial Value after 325° F./30 min. bake | 50 | 90 | 90 |
| after 400° F./60 min. bake | — | — | 100 |

[1] EPON ® 828 epoxy resin which is commercially available from Shell Chemical Company.
[2] Reaction product of $C_{36}$ dimer acid with EPON ® 828 epoxy resin at 70% by weight total solids in EPON ® 828.
[3] NC513 glycidyl ether of alkyl phenol which is commercially available from Cardolite Corp.
[4] FORMOLON F-24 polyvinyl chloride homopolymer which is commercially available from Formosa Industries.
[5] Diethylene glycol adipate polyester having a $M_n$ of about 1000–2000 and an acid value less than 50.
[6] P-108 dicyandiamide/imidazole epoxy curing agent which is commercially available from Shell Chemical Company.
[7] DIURON 3-(3,4-dichlorophenyl)-1,1-dimethylurea which is commercially available from DuPont de Nemours of Wilmington, Delaware.
[8] Mica C-3000 filler which is commercially available from KMG minerals.
[9] Raven 100 carbon black which is commercially available from Colombian Chemicals Co.
[10] EPS-200 ground vulcanized rubber, 200 micron average particle size, which is commercially available from Environmental Processing Systems, Inc. of Mineola, New York.
[11] EPS-140 ground vulcanized rubber, 140 micron particle size, which is commercially available from Environmental Processing Systems, Inc.
[12] BENTONE 27 montmorillonite clay thixotrope which is commercially available from Rheox Inc.
[13] CABOSIL TS-720 fumed silica from which is commercially available Cabot Corp.

As shown in Table 4, the adhesive coating compositions of the present invention (Examples A and B) which included vulcanized ground rubber provided better lap shear strength and/or percent cohesive failure, both before and after salt spray exposure, than the coating of Comparative Example 1 which did not contain vulcanized ground rubber.

TABLE 5

| | Weight percent based upon total weight [based upon total weight of resin solids] | | | | | | | | |
|---|---|---|---|---|---|---|---|---|---|
| Component | Comp. Ex. 2 | Ex. C | Ex. D | Comp. Ex. 3 | Ex. E | Comp. Ex. 4 | Ex. F | Ex. G | Ex. H |
| Epoxy resin[1] | 30.7 [50] | 30.4 [50] | 22 [50] | 24.6 [40] | 24.3 [40] | 60.8 [99] | 60.2 [99] | 51.2 [99] | 60.2 [99] |
| Polyvinyl chloride homopolymer[4] | — | — | — | 6.1 [10] | 6.1 [10] | — | — | — | — |
| Diethylene glycol adipate[5] | 30.7 [50] | 30.4 [50] | 22 [50] | 30.7 [50] | 30.4 [50] | 0.6 [1] | 0.6 [1] | 0.5 [1] | 0.6 [1] |
| Dicyandiamide[6] | 2.2 | 2.2 | 1.6 | 2.2 | 2.2 | 2.2 | 2.2 | 1.8 | 2.2 |
| 3-(3,4-dichlorophenyl)-1,1-dimethylurea[7] | 0.6 | 0.6 | 0.6 | 0.6 | 0.6 | 0.6 | 0.6 | 0.5 | 0.6 |
| Mica[8] | 33.3 [54] | 33.0 [54] | — | 33.3 [54] | 33.0 [54] | 33.3 [54] | 33.0 [54] | — | — |
| carbon black[9] | 0.3 | 0.3 | 0.3 | 0.3 | 0.3 | 0.3 | 0.3 | 0.3 | 0.3 |
| ground vulcanized rubber (200μ)[10] | — | 1 [1] | 52.2 [70] | — | 1 [1] | — | 1 [1] | — | — |
| ground vulcanized rubber (140μ)[11] | — | — | — | — | — | — | — | 43.8 [50] | 6.2 [10] |
| Montmorillonite clay thixotrope[12] | 2.1 | 2.1 | 1.5 | 2.1 | 2.1 | — | 2.1 | 1.8 | 2.1 |
| Lap Shear Strength (psi) | | | | | | | | | |
| Initial Value after 400° F./60 min. bake | 411 | 481 | 265 | 124 | 126 | 1096 | 1508 | 1071 | 1762 |
| Failure mode (% cohesive) | | | | | | | | | |
| Initial Value after 400° F./60 min. bake | 60 | 98 | 78 | 53 | 100 | 5 | 0 | 100 | 50 |
| Lap Shear Strength after 250 hrs. salt spray (psi) | | | | | | | | | |
| Initial Value after 400° F./60 min. bake | 29 | 139 | 63 | 0 | 28 | 1233 | 1328 | 864 | 1612 |
| Failure mode (% cohesive) | | | | | | | | | |
| Initial Value after 400° F./60 min. bake | 3 | 8 | 8 | 0 | 70 | 0 | 5 | 65 | 0 | footnotes see Table 4 above.

As shown in Table 5, the coating compositions of Examples C, D and E, including ground vulcanized rubber according to the present invention, had better cohesive failure and salt spray resistance than the coatings of Comparative Examples 2 and 3, respectively, which did not contain vulcanized ground rubber. Compared to Comparative Example 4, coating composition Example F had better strength, coating composition Example G had better cohesive failure and Example H had better initial strength and cohesive failure.

Figure 4:
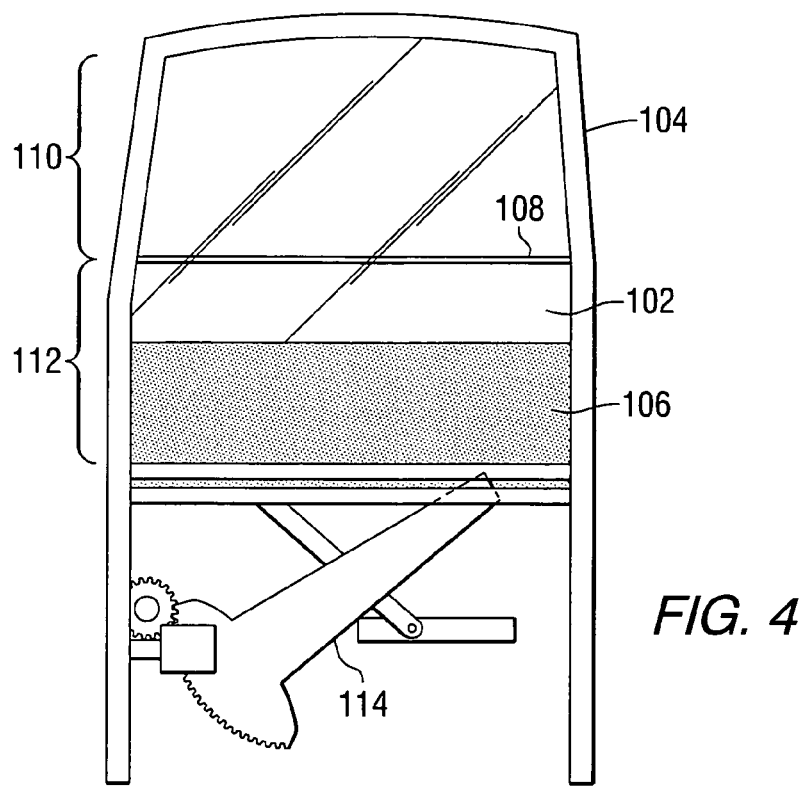
FIG. 4 is a front plan view of an automotive transparency according to an embodiment of the invention including a sound and vibration dampening coating on one side.

As shown in FIG. 4, in one embodiment, a transparency 102 contained within an automobile door frame 104 is shown in a shut position. A coating 106 is applied onto at least a portion of the bottom region 112 (the non-vision area) of the transparency 102 below the belt line 108 of the door frame 104. By "non-vision area" is meant an area of the transparency through which an operator or passenger does not normally see. In FIG. 4, the bottom region 112 is below the belt line 104 even if the transparency 102 is fully raised. The coating 106 can be a sound and/or vibration dampening coating as discussed above. The belt line 108 visually separates the upper area 110 (the vision area) of the side light transparency 102 from the bottom region 112 of the transparency 102. The transparency 102 is moved into an open and shut position via a lifting mechanism 114, or other suitable means now known or heretofore developed in the art.

Figure 5:
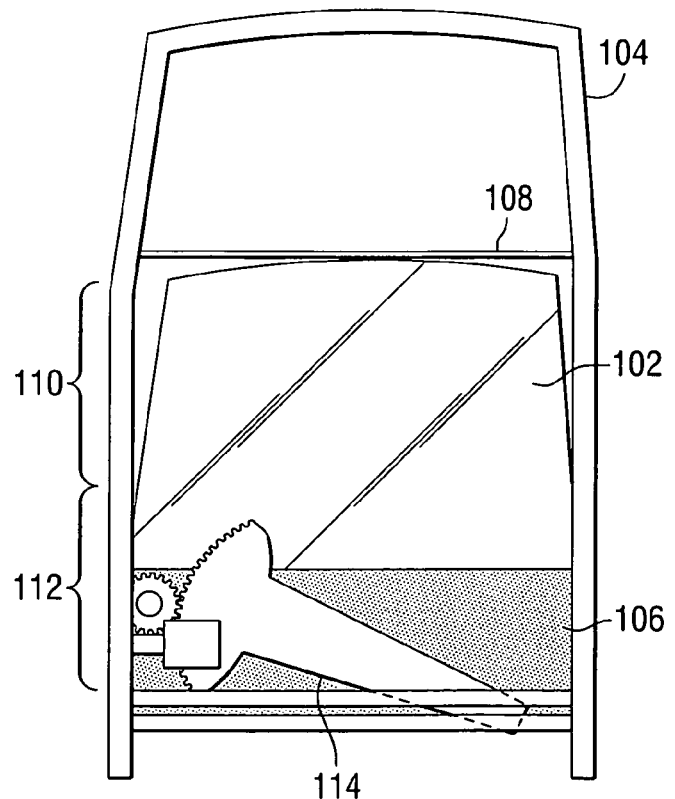
FIG. 5 is a front plan view of the automotive transparency of FIG. 4, showing the entire transparency below the belt line of the door frame.

FIG. 5 shows the transparency 102 of FIG. 4 in an open position.

The coating 106 may be applied onto the outer surface, the inner surface, or both surfaces of the transparency 102. In one non-limiting embodiment, the coating 106 is applied only on the outer surface of the transparency 102. In one embodiment, the coating 106 is selected from any or all of exemplary Compositions A, B, or C, described above. Further, the coating 106 may be applied as an approximately 2 inch (5.08 cm) wide strip that covers approximately 80% of the length of the transparency 102 on the bottom region 112 of the transparency 102. Alternatively, the coating 106 may be applied as a plurality of strips, wavy lines, stipples or any other desired pattern on the bottom region 112 of the transparency 102.

The coating 106 may be applied onto a variety of substrates including, but not limited to, monolithic or laminated transparencies. Additionally, the coating 106 may be applied in conjunction with transparencies that have rigid or flexible clips attached thereto. The coating 106 may be applied onto the transparency 102 before or after the installation of mounting hardware and/or the lifting mechanism 114.

The coating 106 can be applied to one or more of the transparencies of a vehicle. In one non-limiting embodiment, the coating 106 is applied to all of the sidelight and backlight transparencies of a vehicle, such as an automobile. Further, the coating 106 may be applied to transparencies used in a variety of vehicles, including, but not limited to, automobiles, buses, trains, helicopters, and boats.

Figure 6:
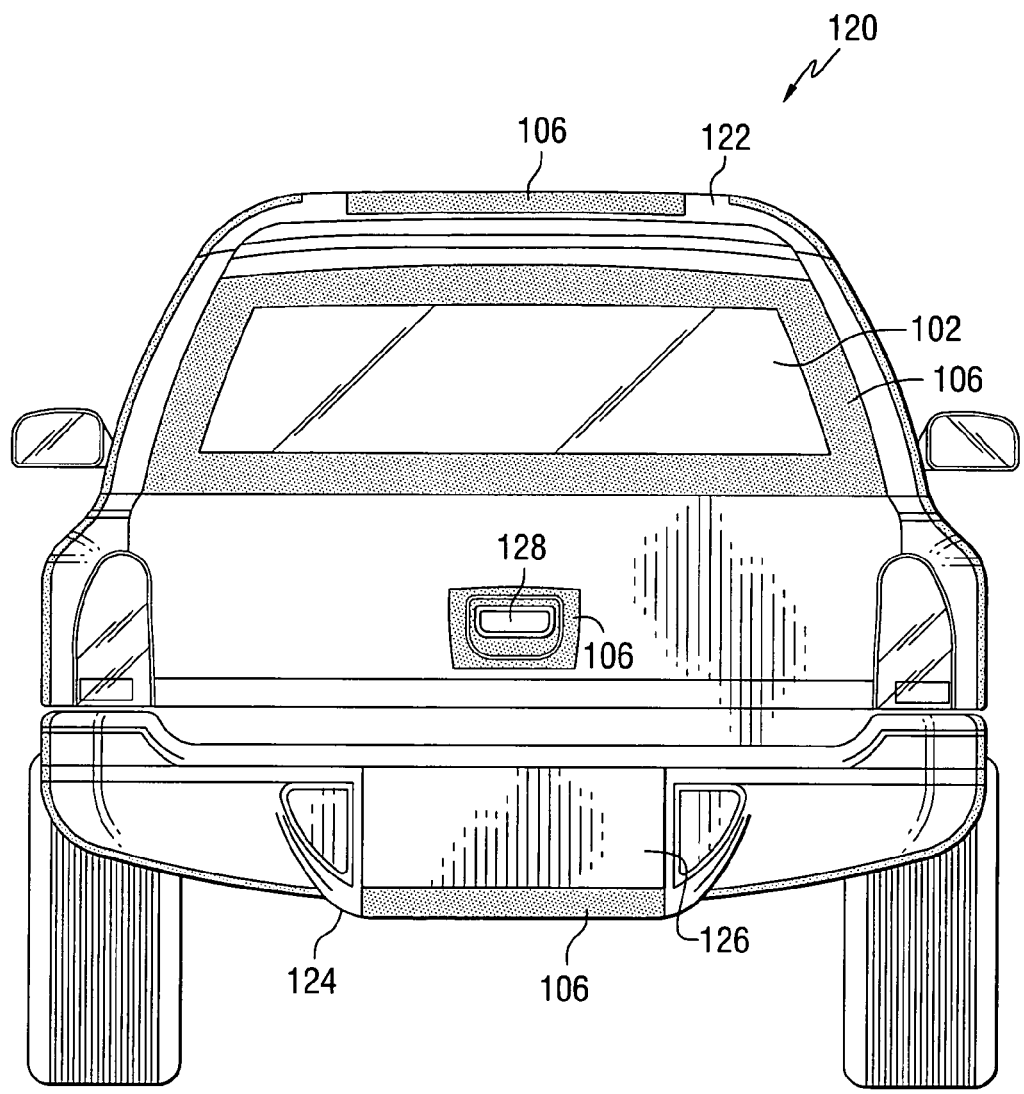
FIG. 6 is a front plan view of the back portion of an automobile.

As shown in FIG. 6, in another non-limiting embodiment, the coating 106 may also be applied to the exterior surface of a vehicle 120 to provide surface texture and aesthetic appeal. For this use, the coating 106 may be, but is not limited to, exemplary Compositions A, B or C disclosed herein. FIG. 6 illustrates the application of the coating 106 on the outer surface of a rear window transparency 102. Further, the coating 106 is also shown as applied to the roof 122 of the vehicle 120, the rest area 124 under the license plate portion 126, and the periphery around the rear door handle 128. However, the possible locations to apply the coating 106 to the exterior surface of a vehicle 120 are not limited to these exemplary locations. For instance, the coating 106 may be applied to footboards, windshields, side light transparencies, back light transparencies, doors, trunks, hoods, grilles, side door handles, back door handles, bumpers, side walls, etc. Essentially, the coating 106 may be applied to any part of a vehicle where surface texture and aesthetic appeal are desired. For instance, the presence of the coating 106 on the roof 122 of a vehicle 120 provides a textured surface so that cargo, such as pieces of luggage or a mattress, have more frictional support when they are being transported on the roof of a vehicle. Additionally, the coating 106 may be applied to desired portions of the exterior surface of vehicle 120 to provide a rugged-looking aesthetic effect. This application would be especially desirable for motorcycles, jeeps, sport utility vehicles and trucks.

If the coating 106 is to be applied to a transparency 102 to provide surface texture and aesthetic appeal and/or sound dampening, then an adhesion promoter, such as a 5% silane solution, can be applied to the transparency 102 before the coating 106 is applied. However, the coating 106 may be applied to painted surfaces, such as car doors, without the prior application of an adhesion promoter. Further, the coating 106 may be applied to a surface meant to be applied over the coating 106, such as a door, before the surface is painted.

The coating 106 may be color-keyed so that it approximates or complements the color of the surface to which it is applied and/or surrounding surfaces.

The coating 106 provides a low-cost alternative to hardware-mounted, plastic molded appliqués. It provides a three-dimensional appearance to surfaces that is aesthetically similar to plastic bonded trim components, such as appliqués. Further, the coating 106 can be applied over hardware-mounted, plastic molded appliqués to provide stability to their affixation to a vehicle and to also protect them from physical and/or environmental wear and tear. Illustrative examples of such appliqués include manufacturer insignias, e.g., Chevy, Mercedes Benz, Audi, Ford, etc. insignias, that are typically applied to cars manufactured by these companies to act as source indicators. However, other appliqués, such as sports team symbols, rock band names and decorative symbols, etc. may also be replicated or covered with the coating 106 of the present invention.

Exemplary coatings 106 as disclosed in Composition A herein are available under the tradename Durabed® from PPG Industries, Inc., Pittsburgh, Pa. Exemplary coatings 106 as disclosed in Compositions B and C herein are available under the tradename Audioguard® from PPG Industries, Inc., Pittsburgh, Pa.

Whereas particular embodiments of this invention have been described above for purposes of illustration, it will be evident to those skilled in the art that numerous variations of the details of the present invention may be made without departing from the invention as defined in the claims.

Therefore, what is claimed is:

1. A method for providing a coated vehicle transparency, comprising the steps of:
   a) providing a vehicle transparency having a glass substrate with a peripheral area; and
   b) applying a coating composition to at least a portion of the peripheral area of the transparency to reduce noise permeating into a vehicle,
   wherein the coating composition comprises an aqueous dispersion of polymeric microparticles prepared from components comprising: (i) a functional material selected from (a) a nitrile functional material, (b) an amide functional material, and (c) a carbamate functional material; (ii) a polyoxyalkylene acrylate; and (iii) a filler material; and further comprising at least partially drying the coating composition to provide a coating upon the transparency for inhibiting sound transmission therethrough.

2. The method of claim 1, wherein the functional material is a nitrile functional material selected from acrylonitrile, methacrylonitrile, esters thereof, copolymers thereof mixtures thereof.

3. The method of claim 1, wherein the polyoxyalkylene acrylate is selected from alkoxy polyoxyethylene acrylates, alkoxy polyoxyethylene methacrylates, alkoxy polyoxypropylene acrylates, alkoxy polyoxypropylene methacrylates, alkoxy polyoxyethyleneoxypropylene acrylates, alkoxy polyoxyethyleneoxypropylene methacrylates, alkoxy polyoxybutylene acrylates, alkoxy polyoxybutylene methacrylates, copolymers thereof and mixtures thereof.

4. The method of claim 1, wherein the polymeric microparticles comprise the reaction product or a blend of components comprising: (i) a nitrile functional material; and (ii) the polyoxyalkylene acrylate.

5. The method of claim 1, wherein the filler material comprises about 20 to about 90 weight percent of the coating composition on a basis of total weight of the coating composition.

6. The method of claim 1, wherein the coating composition further comprises a polymeric film-forming material different from the polymeric microparticles, and is selected from polyepoxides, polyurethanes, polyamides, polyesters, polyacrylates, polyvinyl chlorides, and mixtures thereof and copolymers thereof.

* * * * *